(12) United States Patent
Tilahun et al.

(10) Patent No.: US 12,020,234 B2
(45) Date of Patent: Jun. 25, 2024

(54) PROXIMITY-BASED CHECK-IN

(71) Applicant: PayPal, Inc., San Jose, CA (US)

(72) Inventors: Yoseph Tilahun, San Jose, CA (US); Biju Balakrishnan Nair, Pleasanton, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/445,925

(22) Filed: Aug. 25, 2021

(65) Prior Publication Data

US 2023/0067746 A1 Mar. 2, 2023

(51) Int. Cl.
G06Q 20/20 (2012.01)
G06Q 20/10 (2012.01)
G06Q 20/32 (2012.01)
G06Q 20/40 (2012.01)
H04L 67/02 (2022.01)
H04W 4/021 (2018.01)

(52) U.S. Cl.
CPC ....... *G06Q 20/3276* (2013.01); *G06Q 20/102* (2013.01); *G06Q 20/20* (2013.01); *G06Q 20/4014* (2013.01); *H04L 67/02* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 10,366,385 B1* | 7/2019 | Ramalingam | ...... | G06Q 30/0641 |
| 10,810,574 B1* | 10/2020 | Wilson | ................. | G06Q 20/389 |
| 11,341,523 B1* | 5/2022 | Jacoby | ................. | G06Q 20/351 |
| 2015/0178822 A1* | 6/2015 | Babiarz | .............. | G06Q 30/0631 |
| | | | | 705/26.7 |
| 2017/0364901 A1* | 12/2017 | Chandrasekaran | ... | H04W 12/08 |
| 2020/0104822 A1* | 4/2020 | Govindarajan | ...... | G06Q 20/327 |
| 2022/0076240 A1* | 3/2022 | Ghani | ................ | G06Q 20/3825 |

OTHER PUBLICATIONS

[Google Developers]. (Jul. 13, 2016). *Introduction to Hand Free Payments* [Video]. YouTube. https://www.youtube.com/watch?v=3yUJZ3bCuKy0.
Boden, Rian. (Mar. 3, 2016). *Google pilots hand-free payments in San Francisco.* Retrieved Aug. 25, 2021, from https://www.nfcw.com/2016/03/03/342883/google-pilots-hands-free-payments-san francisco/.

* cited by examiner

*Primary Examiner* — Joseph W. King
(74) *Attorney, Agent, or Firm* — Haynes and Boone, LLP

(57) ABSTRACT

A payment service provider device determines that a first geolocation of a user device is within a predetermined proximity to a second geolocation associated with a merchant Point-Of-Sale (POS) device that is coupled to a network and provides, via the network to the merchant POS device, a communication that includes a user identifier associated with a user of the user device, such that the communication causes the user identifier to be displayed on a display device associated with the merchant POS device and the user is checked-in at a merchant location associated with the merchant POS and the second geolocation. The payment service provider device receives, via the network, a payment request that is associated with the user identifier, and then completes the payment request using a user account associated with the user identifier.

20 Claims, 18 Drawing Sheets

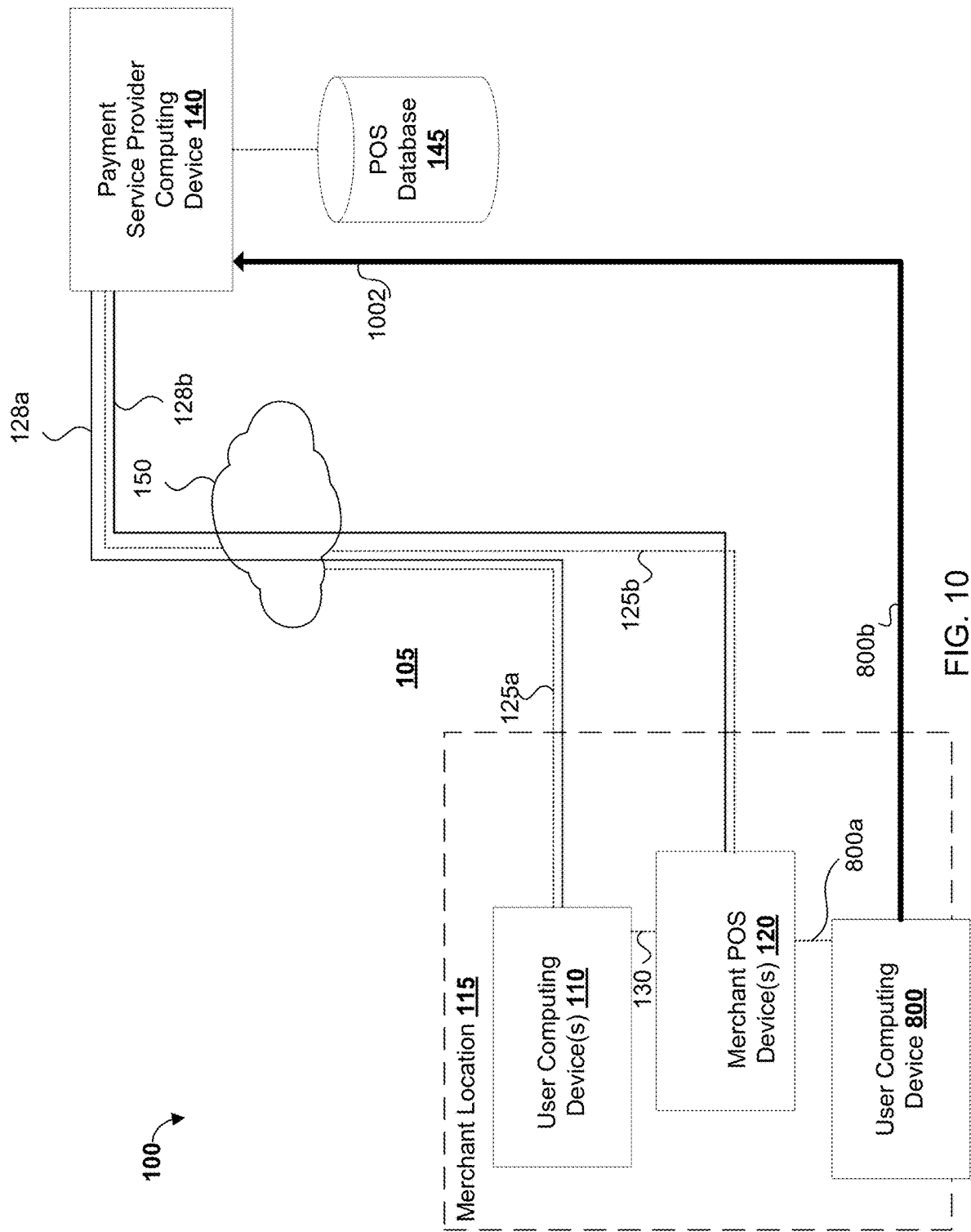

PROXIMITY-BASED CHECK-IN

TECHNICAL FIELD

The present disclosure generally relates to point-of-sale systems and methods and, more particularly, to proximity-based check-ins at a point-of-sale system according to various embodiments.

BACKGROUND

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, VENMO®, Inc. of San Jose, CA or PAYPAL®, Inc. of San Jose, CA Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. In some instances, a consumer may facilitate a purchase with the mobile device for a product and/or service that requires the user to obtain that product and/or service at a merchant location. In other instances, to complete the purchase, the consumer interacts with a point-of-sale (POS) device such as a cash register or a computer terminal executing merchant-specific applications for processing transactions. These traditional terminals are typically placed on or behind a counter and conduct transactions at the counter. Furthermore, mobile POS terminals such as those provided by PAYPAL® ZETTLE of Stockholm, Sweden may be used to complete transactions away from the counter. Also, when completing payment requests with these merchant computer terminals, the consumer may use a payment service provider application on their mobile computing device to complete the transaction with the merchant computer terminal such that the consumer does not require a physical credit card, cash, or check to complete the transaction.

BRIEF DESCRIPTION OF THE FIGURES

FIG. 6B are screenshots illustrating an embodiment of a Graphical User Interface (GUI) on the merchant computing device and a GUI on the user computing device included in the proximity-based check-in system of FIG. 1 displayed during the method of FIG. 5.

FIG. 8B are screenshots illustrating an embodiment of the GUI on the merchant computing device and the GUI on the user computing device included in the proximity-based check-in system of FIG. 1 displayed during the method of FIG. 5.

FIG. 10 is a schematic view illustrating an embodiment of the proximity-based check-in system of FIG. 1 used in performing the method of FIG. 5.

Figure 1:
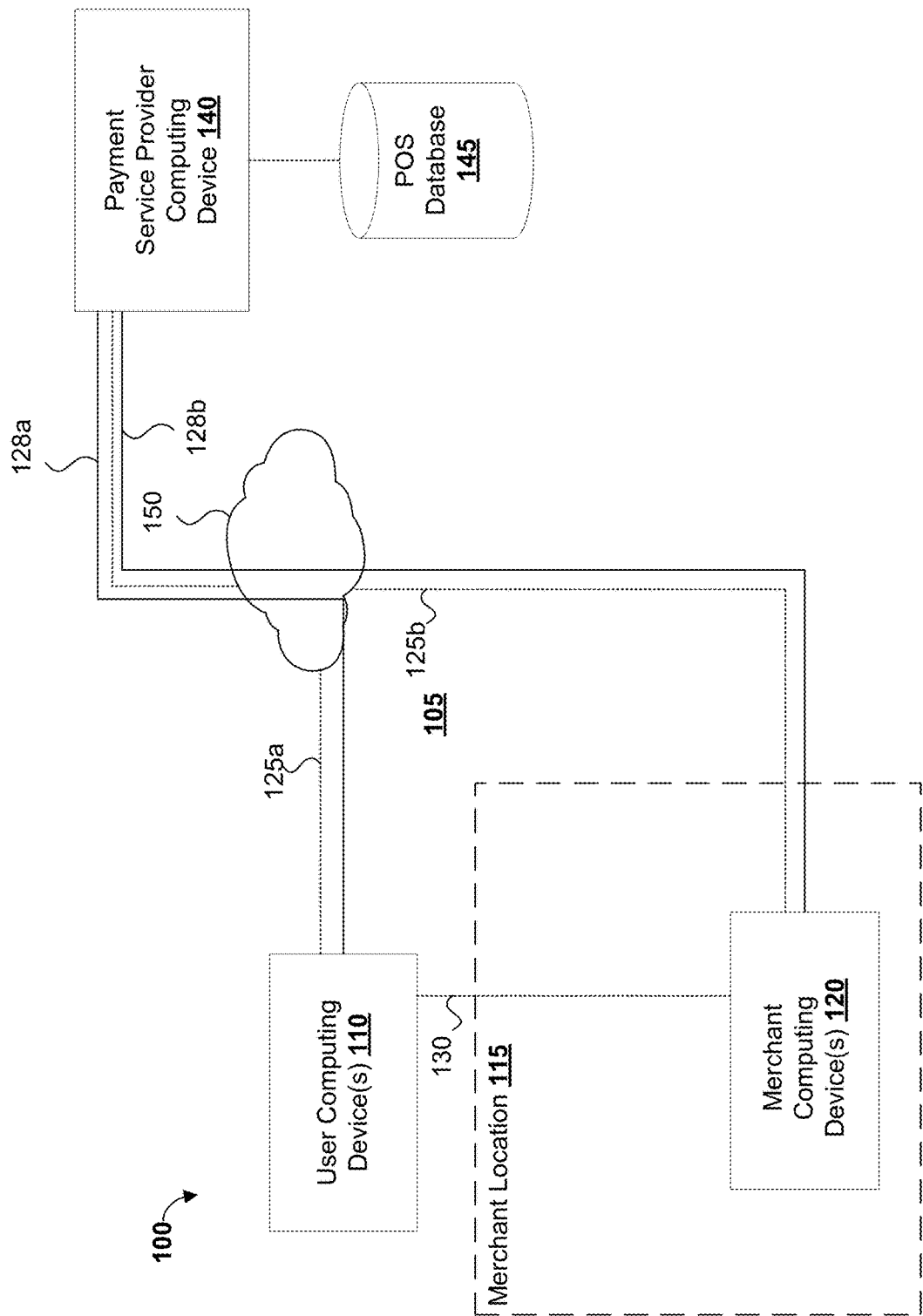
FIG. 1 is a schematic view illustrating an embodiment of a proximity-based check-in system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The disclosure provides systems, methods, and computer program products for proximity-based check-in of a user at a merchant location for completing a payment request. Contactless transactions for goods and/or services are increasing. Some consumers may order goods and/or services ahead of time and pay while picking up in-store. Other consumers may select items for purchase at the merchant location itself and checkout at a merchant point-of-sale device. Completing a payment request for goods and/or services without physically interacting with the merchant point-of-sale (POS) device and using a user's mobile device is becoming a preferred method of consumers and merchants as it may be quicker, cleaner, more secure, and provide other benefits. Some conventional contactless payment systems are provided by AMAZON® of Seattle, WA This system checks-in a user at the store when the user scans a QR code on a mobile application at a kiosk when the user enters the store. By checking in, the user is associated with that merchant location. Various cameras and sensors track the user and what goods the user has acquired. When the user leaves the merchant location, the system charges the cost of the goods to the user's account that was used for checking-in the user. While this check-in system provides convenience, it has its drawbacks. For example, additional hardware is often required or the service is merchant specific such that it cannot be used easily with other merchants using the same mobile application.

Other systems, provided by GOOGLE® of Mountain View, CA, provide a mobile application that uses Bluetooth Low Energy (BLE), WiFi and location services on a mobile device to detect whether a user is near a participating merchant. When the user is ready to pay, the user can tell the merchant that the user will pay with the particular application. The merchant then asks for the user's initials and uses a photo to confirm identity or the POS device uses a camera and a facial recognition algorithm to confirm identity. However, this system relies on communications between devices within the environment such as beacons that connect the user device to the merchant POS device, which may be inaccurate due to interference or other connectivity issues.

Systems and methods of the present disclosure provide for proximity-based check-in at a merchant location to complete a payment request for a purchase of goods and/or services between a user and a merchant. When a user is checked-in to a merchant location based on that user's user device being in proximity of a merchant location, a user identifier associated with the user may populate a POS application GUI of a merchant POS device. The user and merchant may conduct a transaction at the merchant POS device and select the user identifier to complete a payment request by a payment service provider. The user may receive a notification of the payment request and approve the payment request which causes the payment service provider to complete the payment request and process the payment to complete the transaction.

More specifically, by establishing a communication channel between the merchant POS device with the payment service provider server and communication channels between each user device and the payment service provider server where the communication channels utilize a full-duplex communication protocol such as WebSocket protocol, the proximity-based check-in system of the present disclosure provides control at the backend payment service provider server and may provide unique user experiences based on the particular user device and the particular merchant POS device. As such, the system may be independent of a particular merchant. Furthermore, by providing the communications and location determinations through the payment service provider server, the system may be more reliable and secure.

Referring now to FIG. 1, an embodiment of a proximity-based check-in system 100 is illustrated. In the illustrated embodiment, the proximity-based check-in system 100 includes a user computing device 110 provided in a physical environment 105. The physical environment 105 may be any indoor and/or outdoor space that may be contiguous or non-contiguous. For example, the physical environment 105 may include a business, a park, a stadium, a museum, an amusement park, a mall, an airspace, a body of water, and/or other spaces. The physical environment 105 may be defined by geofencing techniques that may include specific geographic coordinates such as latitude, longitude, and/or altitude, and/or operate within a range defined by a wireless communication signal. The physical environment 105 may include a plurality of merchant locations such as a merchant location 115 including, for example, a gas station, a restaurant, a department store, a grocery store, a toll both, a drycleaner, an amusement park, a coffee shop, and/or any other merchant location that would be apparent to one of skill in the art in possession of the present disclosure. As discussed above, the physical environment 105 may include one or more user computing devices 110 (e.g., autonomous/non-autonomous vehicles, transportation devices, tablets, laptops, smart phones, wearables, and/or other user computing devices that would be apparent to one of skill in the art in possession of the present disclosure).

In various embodiments, the proximity-based check-in system 100 may include a merchant computing device 120. The merchant computing device 120 may be provided at the merchant location 115 in the physical environment 105 to complete a payment transaction, search for inventory, track inventory, track patrons, track orders, take orders, and/or any other merchant actions that would be apparent to one of skill in the art in possession of the present disclosure. For example, the merchant computing device 120 may be a POS device (fixed and/or mobile), a merchant terminal, a merchant kiosk, and/or any other merchant computing device that would be apparent to one of skill in the art in possession of the present disclosure. Of course, in various embodiments, some or all of the components of the merchant computing device 120 could be physically located at other locations than at the merchant location 115 (e.g., a mobile merchant computing device that may be used during deliveries that may extend the merchant location 115 to other geolocations than a fixed geolocation as illustrated by merchant location 115. The merchant computing device 120 may be used to collect and send data about the physical environment 105 and/or the merchant location 115 to a central monitoring station for further analysis or action using common networking and communication techniques, commonly specified 5G or subsequently developed adaptive multi-bandwidth approaches. As such, the user computing device 110 and/or the merchant computing device 120 may include communication units having one or more transceivers to enable the user computing device 110 and the merchant to communicate with each other and/or a payment service provider computing device 140 via a network 150. Accordingly and as discussed in further detail below, the user computing device 110 may be in communication with the merchant computing device 120 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the user computing device 110 and/or the merchant computing device 120 in the proximity-based check-in system 100 of FIG. 1 may include first (e.g., relatively long-range) transceiver(s) to permit the user computing device 110 and/or the merchant computing device 120 to communicate with the network 150 via a communication connection 125a and a communication connection 125b. The communication connection 125a may provide a communication channel 128a between the user computing device 110 and the payment service provider computing device 140, and the communication connection 125b may provide a communication channel 128b between the merchant computing device 120 and the payment service provider computing device 140. The communication channels 128a and 128b may be generated according to a full-duplex communication protocol such as, for example, WebSocket, and/or any other full-duplex communication protocol that would be apparent to one of skill in the art in possession of the present disclosure. WebSocket may create a permanent TCP connection between devices and provides a bi-directional communication model. The difference between WebSocket and Hypertext Transfer Protocol Secure (HTTPS), which also creates a TCP connection, is that when HTTPS creates a TCP connection, HTTPS performs request/response and disconnects the TCP connection. However, creating a TCP connection for each request/response communication for a process that requires multiple communications is resource intensive. In contrast, WebSocket may create the TCP connection once, use send and receive as needed, and bring down the connection after the process is completed.

In various embodiments, the network 150 may be implemented by an example mobile cellular network, such as a long-term evolution (LTE) network or other third generation (3G), fourth generation (4G) wireless network, or fifth-generation (5G) wireless network. However, in some examples, the network 150 may be additionally or alternatively be implemented by one or more other communication networks, such as, but not limited to, a satellite communication network, a microwave radio network, wired communication systems, Wi-Fi communication systems, and/or other communication networks.

The user computing device 110 and/or the merchant computing device 120 additionally may include second (e.g., relatively short-range) transceiver(s) to permit the user computing device 110 and/or the merchant computing device 120 to communicate with each other via a direct communication connection 130. Furthermore, the second transceiver may be used for user device-to-user device communications between the user computing device 110 and other user computing devices and/or merchant device-to-merchant device communication between the merchant computing device 120 and other merchant computing devices in the merchant location 115. In the illustrated example of FIG. 1, such second transceivers are implemented by a type of transceiver supporting short-range (e.g., operate at distances that are shorter than the long-range transceivers) wireless networking. For example, such second transceivers may be implemented by a Wi-Fi transceiver (e.g., via a Wi-Fi Direct protocol), a Bluetooth® transceiver, an infrared (IR) transceiver, a Zigbee transceiver, and/or other transceivers that are configured to allow the user computing device 110 and/or the merchant computing device 120 to intercommunicate via a the communication connection 130 or a Local Area Network (LAN).

The proximity-based check-in system 100 also includes or may be in communication with a payment service provider computing device 140. For example, the payment service provider computing device 140 may include one or more servers, storage systems, cloud computing systems, and/or other computing devices (e.g., desktop computing device(s), laptop/notebook computing device(s), tablet computing device(s), mobile phone(s), etc.). As discussed below, the payment service provider computing device 140 may be coupled to a POS database 145 that is configured to provide repositories such as user accounts that include payment information, user identifier information, user device identifier information, merchant rewards information, loyalty information, location information, and/or any other information associated with a user, that user's user account, and that user's user devices that would be apparent to one of skill in the art in possession of the present disclosure. The repositories included in the POS database 145 may also include any merchant accounts that include merchant identifiers, merchant location information, merchant computing device information including merchant computing device identifiers and locations, general merchant coupons, merchant location specific coupons, and/or any other merchant information that would be apparent to one of skill in the art in possession of the present disclosure. The POS database 145 may also include any check-in data such as which users are checked-in at which merchant locations.

Also, the payment service provider computing device 140 may be configured to computationally process sensor data (e.g., sensor data that includes environmental information, user device information, merchant information, and/or other information) received from the user computing devices 110 and/or the merchant computing device 120 and render instructions to the user computing devices 110 and/or the merchant computing device 120. While a proximity-based check-in system 100 has been illustrated and described, one of skill in the art in possession of the present disclosure will recognize that the teachings of the present disclosure will be beneficial for a variety of proximity-based token issuance systems that would be apparent to one of skill in the art in possession of the present disclosure and, as such, a wide variety of modifications to the number, types, and orientation of devices in the proximity-based check-in system 100 will fall within the scope of the present disclosure as well.

Figure 2:
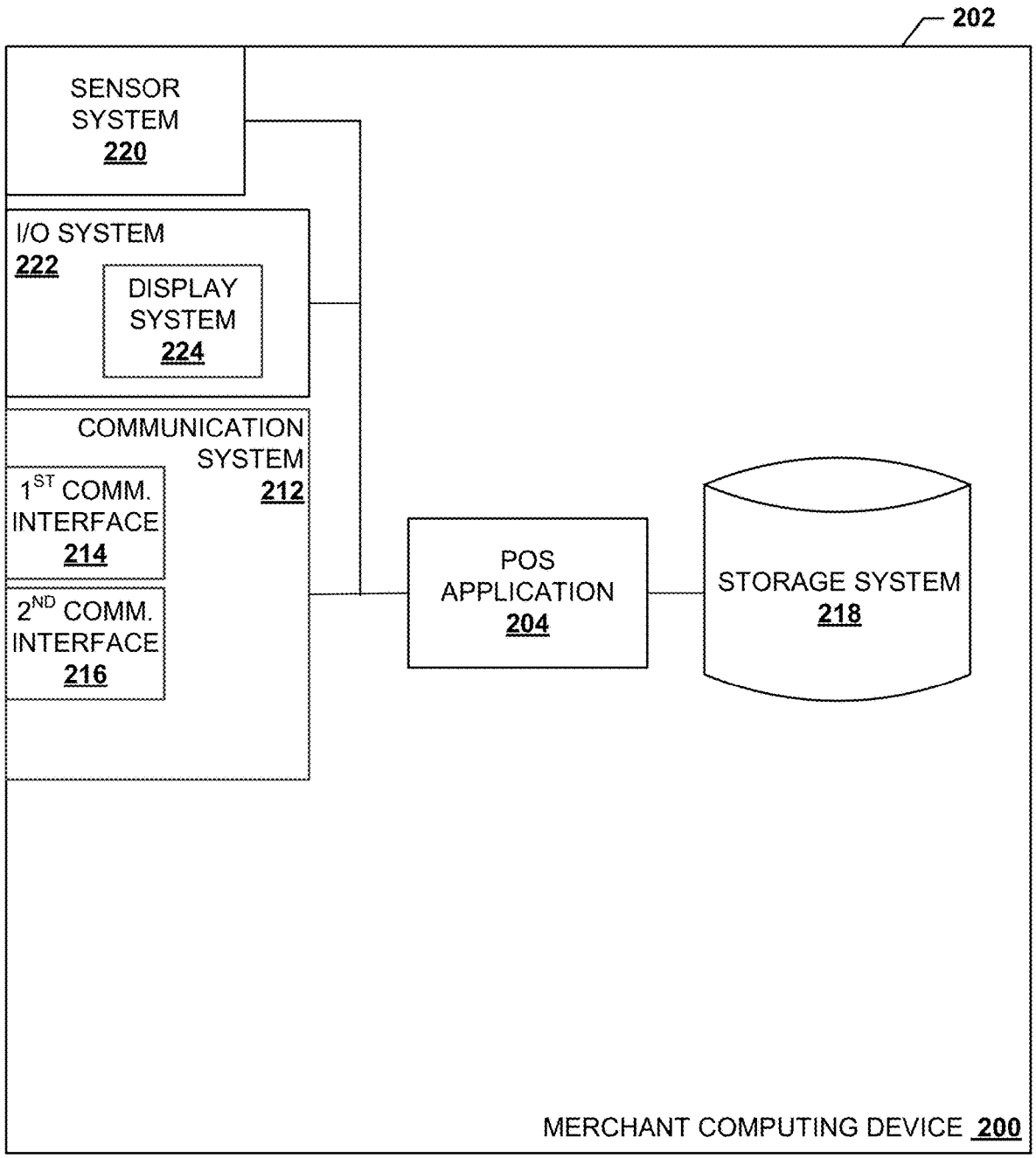
FIG. 2 is a schematic view illustrating an embodiment of a merchant computing device used in the proximity-based check-in system of FIG. 1.

Referring now to FIG. 2, an embodiment of a merchant computing device 200 is illustrated that may be the merchant computing device 120 discussed above with reference to FIG. 1. In the illustrated embodiment, the merchant computing device 200 includes a chassis 202 that houses the components of the merchant computing device 200. Several of these components are illustrated in FIG. 2. For example, the chassis 202 may house a processing system (not illustrated) and a non-transitory memory system (not illustrated) that includes instructions that, when executed by the processing system, cause the processing system to provide a point-of-sale (POS) application 204 that is configured to perform the functions of the POS applications and/or the merchant computing devices discussed below.

The chassis 202 may further house a communication system 212 that is coupled to the POS application 204 (e.g., via a coupling between the communication system 212 and the processing system). The communication system 212 may include software or instructions that are stored on a computer-readable medium and that allow the merchant computing device 200 to send and receive information through the communication networks discussed above. For example, the communication system 212 may include a first communication interface 214 to provide for communications through the network 150 as detailed above (e.g., first (e.g., long-range) transceiver(s)). In an embodiment, the first communication interface 214 may be a wireless antenna that is configured to provide communications with IEEE 802.11 protocols (Wi-Fi), cellular communications, satellite communications, other microwave radio communications and/or communications. The communication system 212 may also include a second communication interface 216 that is configured to provide direct communication with the user computing device 110, other merchant computing devices, and/or other devices within the physical environment 105 discussed above with respect to FIG. 1 (e.g., second (e.g., relatively short-range) transceiver(s)). For example, the second communication interface 216 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may also house a storage system 218 that is coupled to the POS application 204 through the processing system. The storage system 218 may store sensor data, user instructions associated with various checked-in users, user identifiers, a user check-in list, and/or any other instructions and/or information that would be apparent to one of skill in the art in possession of the present disclosure.

In various embodiments, the merchant computing device 200 may include a sensor system 220 that may be housed in the chassis 202 and/or provided on the chassis 202. The sensor system 220 may be coupled to the POS application 204 via the processing system. The sensor system 220 may include one or more sensors that gather sensor data about the merchant computing device 200 and/or the physical environment 105 that may be provided to the POS application 204. For example, the sensor system 220 may include a camera, a proximity sensor, and/or any other sensor that would be apparent to one of skill in the art in possession of the present disclosure.

In various embodiments, the chassis 202 also houses a merchant I/O system 222 that is coupled to the POS application 204 (e.g., via a coupling between the processing system and the merchant I/O system 222). In an embodiment, the merchant I/O system 222 may be provided by a keyboard input system, a mouse input system, a track pad input system, a touch input display system, and/or any other input system. In an embodiment, the merchant I/O system 222 may include a user output subsystem such as, for example, a haptic feedback device, a speaker, a light (e.g., an LED) and/or any other user output subsystem that would be apparent to one of skill in the art in possession of the present disclosure. In various embodiments, the user output subsystem may also include a display system 224 that is coupled to the POS application 204 (e.g., via a coupling between the processing system and the display system 224). In an embodiment, the display system 224 may be provided by a display device that is integrated into the merchant computing device 200 and that includes a display screen (e.g., a display screen on a laptop/notebook computing device, a tablet computing device, a mobile phone, or wearable device), or by a display device that is coupled directly to the merchant computing device 200 (e.g., a display device coupled to the merchant computing device 200 by a cabled or wireless connection). While a merchant computing device 200 has been illustrated and described, one of skill in the art in possession of the present disclosure will recognize that the teachings of the present disclosure will be beneficial for a variety of merchant computing devices and, as such, a wide variety of modifications to the number, types, and orientation of devices and modules in the merchant computing device will fall within the scope of the present disclosure as well.

Figure 3:
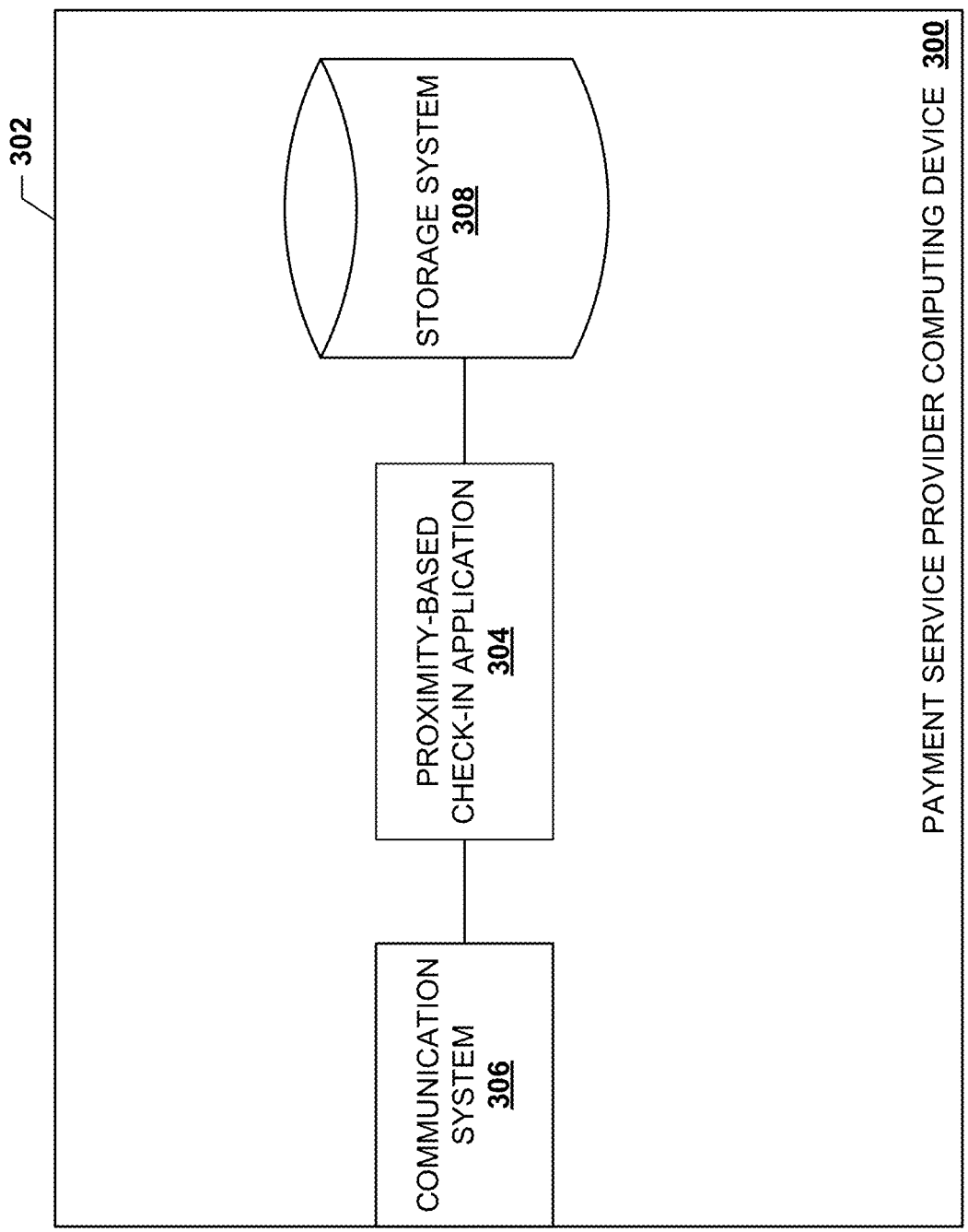
FIG. 3 is a schematic view illustrating an embodiment of a payment service provider computing device used in the proximity-based check-in system of FIG. 1.

Referring now to FIG. 3, an embodiment of a payment service provider computing device 300 is illustrated that may be the payment service provider computing device 140 discussed above with reference to FIG. 1. In various embodiments, the payment service provider computing device 300 includes one or more servers associated with a payment service provider (e.g., VENMO®, Inc. of San Jose, CA or PAYPAL®, Inc. of San Jose, CA) that processes payments for users completing purchase transactions, however other servers that provide other services are contemplated as well. For example, the payment service provider computing device 300 may provide the POS application 204 of the merchant computing device 120/200 and/or services to the POS application 204 (e.g., PAYPAL® ZETTLE). In the illustrated embodiment, the payment service provider computing device 300 includes a chassis 302 that houses the components of the payment service provider computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a proximity-based check-in application 304 that is configured to perform the functions of the proximity-based check-in application and/or payment service provider computing device discussed below.

The chassis 302 may further house a communication system 306 that is coupled to the proximity-based check-in application 304 (e.g., via a coupling between the communication system 306 and the processing system) and that is configured to provide for communication through the network 150 as detailed below. The communication system 306 may allow the payment service provider computing device 300 to send and receive information over the network 150 of FIG. 1. The chassis 302 may also house a storage device (not illustrated) that provides a storage system 308 (e.g., the POS database 145 of FIG. 1) that is coupled to the proximity-based check-in application 304 through the processing system. The storage system 308 may be configured to store authentication credentials, cryptographic keys and/or certificates used to authenticate communication within the proximity-based check-in application 304, user accounts, proximity-based check-in rules and instructions, user accounts that include payment information, user identifier information, user device identifier information, merchant rewards information, loyalty information, location information, and/or any other information associated with a user, that user's user account, and that user's user devices, merchant accounts that include merchant identifiers, merchant location information, merchant computing device information including merchant computing device identifiers and locations, general merchant coupons, merchant location specific coupons, and/or any other information/instructions that would be apparent to one of skill in the art in possession of the present disclosure. While a specific payment service provider computing device 300 has been illustrated and described, one of skill in the art in possession of the present disclosure will recognize that the teachings of the present disclosure will be beneficial for a variety of server devices that would be apparent to one of skill in the art in possession of the present disclosure and, as such, a wide variety of modifications to the number, types, and orientation of devices and modules in the payment service provider computing device 300 will fall within the scope of the present disclosure as well.

Figure 4:
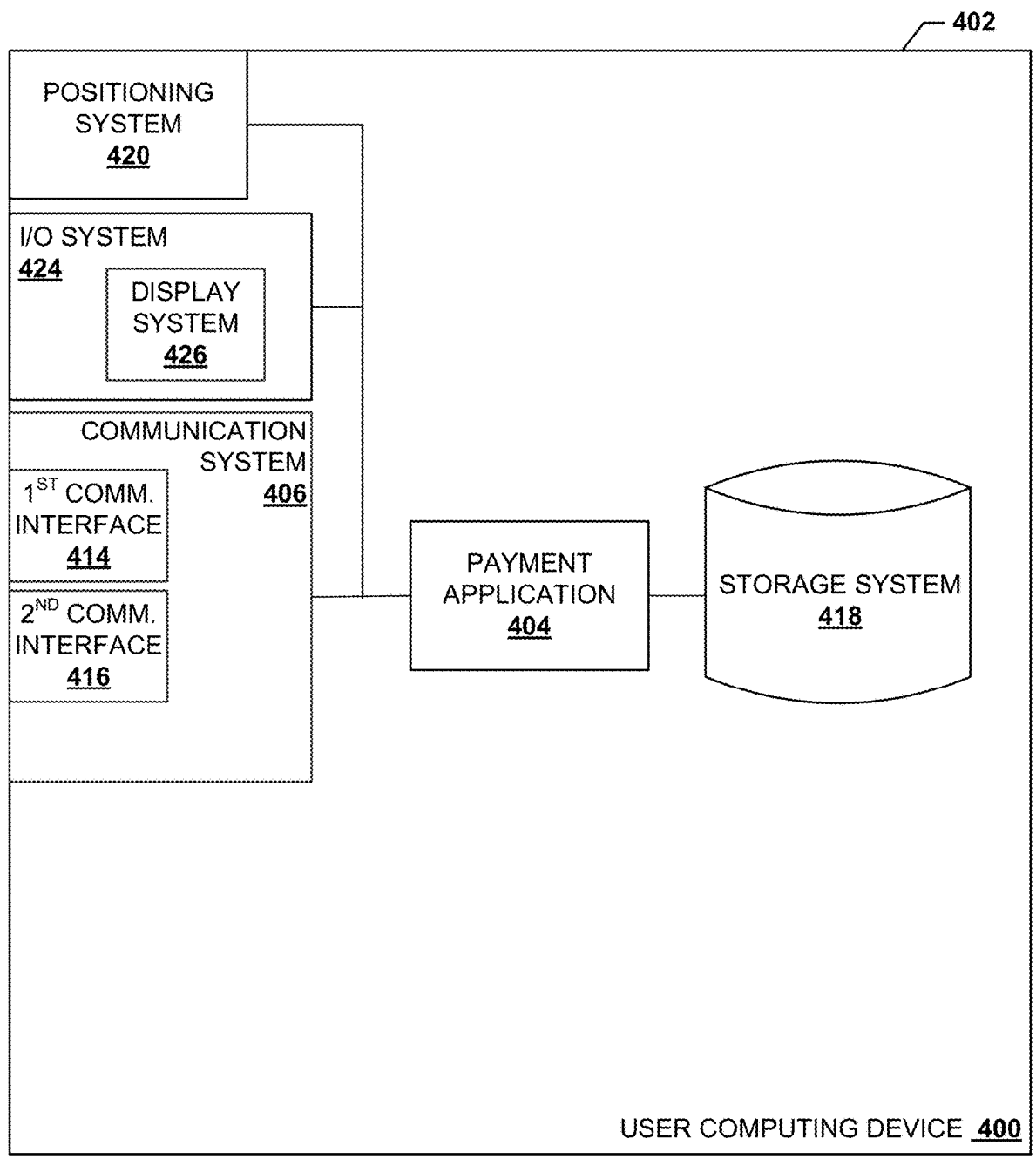
FIG. 4 is a schematic view illustrating an embodiment of a user computing device used in the proximity-based check-in system of FIG. 1.

Referring now to FIG. 4, an embodiment of a user computing device 400 is illustrated that may be the user computing device 110 discussed above with reference to FIG. 1. In the illustrated embodiment, the user computing device 400 includes a chassis 402 that houses the components of the user computing device 400. Several of these components are illustrated in FIG. 4. For example, the chassis 402 may house a processing system (not illustrated) and a non-transitory memory system (not illustrated) that includes instructions that, when executed by the processing system, cause the processing system to provide a payment application 404 that is configured to perform the functions of the payment applications and/or the user computing devices discussed below.

The chassis 402 may further house a communication subsystem 406 that is coupled to the payment application 404 (e.g., via a coupling between the communication subsystem 406 and the processing system). The communication subsystem 406 may include software or instructions that are stored on a computer-readable medium and that allow the user computing device 400 to send and receive information through the communication networks described herein. The communication subsystem 406 may include a communication interface 414. In an embodiment, the communication interface 414 may be configured to operate to communicate with the network 150 of FIG. 1. In an embodiment, the communication interface 414 may be a wireless antenna that is configured to provide communications with IEEE 802.11 protocols (Wi-Fi), cellular communications (e.g., 4G, 4G, 4G LTE, 5G), satellite communications, and/or other microwave radio communications. The communication subsystem 406 may also include a communication interface 416 that is configured to provide direct communication with other user computing devices, merchant computing devices (e.g., merchant computing device 120 of FIG. 1), and other devices within the physical environment 105 discussed above with respect to FIG. 1. For example, the communication interface 416 may include a relatively short-range transceiver when compared to the transceiver included in the communication interface 414. As such, the communication interface 416 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 402 may also house a storage system 418 that is coupled to the payment application 404 (e.g., via a coupling between the processing system and the storage system 418). The storage system 418 may store geographic coordinates of the last known location of the user computing device 110, user computer device information (e.g., a user computing device identifier, user computing device capabilities, etc.), user information about the user that is associated with the user computing device 110, user computing device instructions, and/or other instructions and information that would be apparent to one of skill in the art in possession of the present disclosure.

In various embodiments, the chassis 402 may also include a positioning system 420 that is coupled to the payment application 404 (e.g., via a coupling between the processing system and the positioning system 420). The positioning system 420 may include sensors that are configured to determine their current location and position. For example, the positioning system 420 may include a global positioning system (GPS) receiver, a real-time kinematic (RTK) GPS receiver, a differential GPS receiver, a Wi-Fi based positioning system (WPS) receiver, and/or a variety of other positioning systems and components that would be apparent to one of skill in the art in possession of the present disclosure.

In various embodiments, the chassis 402 also houses a user I/O system 424 that is coupled to the payment application 404 (e.g., via a coupling between the processing system and the user I/O system 424). In an embodiment, the user I/O system 424 may include a user input subsystem that may be provided by a keyboard input system, a mouse input system, a track pad input system, a touch input display system, and/or any other input system. In an embodiment, the user I/O system 424 may include a user output subsystem such as, for example, a haptic feedback device, a speaker, a light (e.g., an LED) and/or any other user output subsystem that would be apparent to one of skill in the art in possession of the present disclosure. In various embodiments, the user output subsystem may also include a display system 426 that is coupled to the payment application 404 (e.g., via a coupling between the processing system and the display system 426). In an embodiment, the display system 426 may be provided by a display device that is integrated into the user computing device 400 and that includes a display screen (e.g., a display screen on a laptop/notebook computing device, a tablet computing device, a mobile phone, or wearable device), or by a display device that is coupled directly to the user computing device 400 (e.g., a display device coupled to the user computing device 400 by a cabled or wireless connection).

While a user computing device 400 has been illustrated and described, one of skill in the art in possession of the present disclosure will recognize that the teachings of the present disclosure will be beneficial for a variety of user computing devices that would be apparent to one of skill in the art in possession of the present disclosure and, as such, a wide variety of modifications to the number, types, and orientation of devices and modules in the user computing device 400 will fall within the scope of the present disclosure as well.

Figure 5:
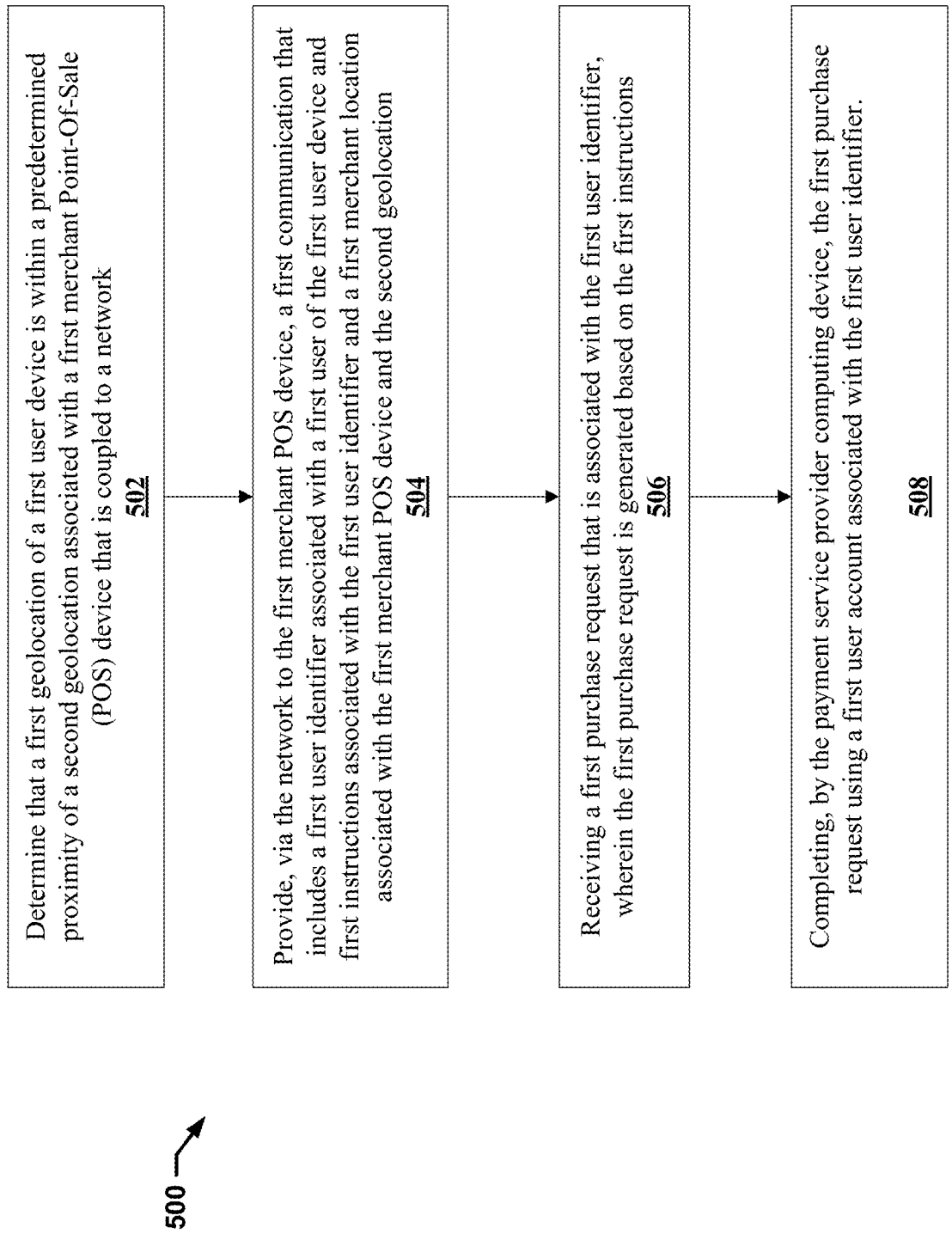
FIG. 5 is a flow chart illustrating an embodiment of a method of proximity-based check-in with a merchant.

Referring now to FIG. 5, an embodiment of a method 500 of proximity-based check-in at a merchant location for conducting payment transactions is illustrated. The method 500 will be discussed in reference to the figures discussed above. The method 500 begins at block 502 where it is determined that one or more merchant check-in conditions associated with checking in a user of a user device at a merchant computing device are satisfied. In an embodiment, at block 502, the payment service provider computing device 140/300, via the proximity-based check-in application 304, may determine whether one or more of the conditions associated with the check-in of a user at the merchant location 115 and/or merchant computing device 120 are satisfied. In an embodiment, the proximity-based check-in application 304 may determine whether a first proximity condition provided by the merchant computing is satisfied. The proximity-based check-in application 304 may receive from the user computing device 110 in the physical environment 105 location information for the user computing device 110. For example, the user computing device 110 may provide, via the network 150 to the payment service provider computing device 140, location information. The location information may include, for example, geographic coordinates of the user computing device within the physical environment 105 determined by the positioning system 420 included in the user computing device 110/400. However, other location information may be contemplated such as, for example, triangulated position based on cell towers/wireless network access points, imaging sensors, signal strength, and/or any other location information determination method that would be apparent to one of skill in the art in possession of the present disclosure.

In various embodiments, prior to sending the location information to the payment service provider computing device 140, the user of the user computing device 110 may open the payment application 404 on the user computing device 110 such that the communication channel 128a may be established between the payment service provider computing device 140 and the payment application 404. As discussed above, the payment application 404 may be provided by PayPal, Venmo, Zettle, and/or any other application that would be apparent to one of skill in the art in possession of the present disclosure. The establishment of the communication channel 128a may indicate that the user of the user computing device 110 is attempting to check-in to a merchant location (e.g., the merchant location 115) that is associated with the proximity-based check-in application 304 provided by the payment service provider computing device 140. In some embodiments, the payment application 404 may periodically provide location information to the payment service provider computing device 140 via the communication channel 128a. In various embodiments, the payment application 404 may be communicating with the payment service provider computing device 140 while operating in the background of the user computing device 110.

When the payment service provider computing device 140 receives the location information, the location information may include the distance of the user computing device from the merchant location 115 and/or the merchant computing device 120, and/or a coordinate of the user computing device 110 that identifies the location of the user computing device 110 in the physical environment 105 from which a distance can be determined to a coordinate of the merchant location 115 and/or the merchant computing device 120 that is stored in the POS database 145. In some embodiments, the coordinates of the merchant computing device 120 may be updated periodically in the POS database 145 if that merchant computing device 120 is a mobile terminal. The updating of the location of the merchant computing device 120 may occur via the communication channel 128b.

The payment service provider computing device 140 may then determine whether the distance between the merchant location 115 and/or the merchant computing device 120 and the user computing device 110 satisfies the first proximity condition or does not satisfy the first proximity condition. For example, the proximity-based check-in application 304 may compare the distance to a distance threshold and if the distance is less than or equal to the distance threshold, the distance satisfies the first proximity condition and if the distance is greater than the distance threshold, then the distance does not satisfy the first proximity condition. However, one of skill in the art in possession of the present disclosure will recognize that other proximity conditions, such as time to arrival, may be considered and still fall under the scope of the present disclosure.

Figure 6A:
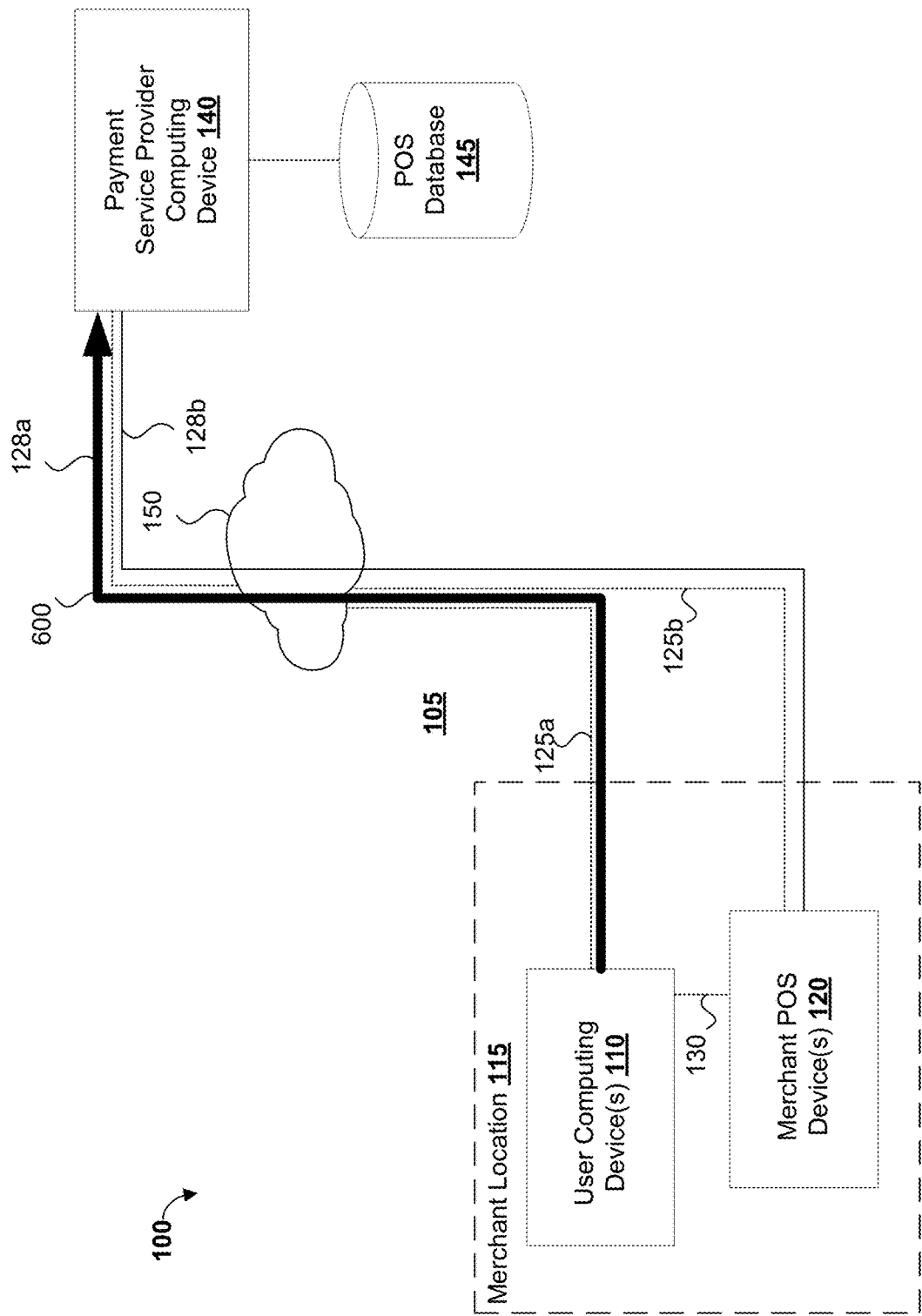
FIG. 6A is a schematic view illustrating an embodiment of the proximity-based check-in system of FIG. 1 used in performing the method of FIG. 5.
Figure 6B:
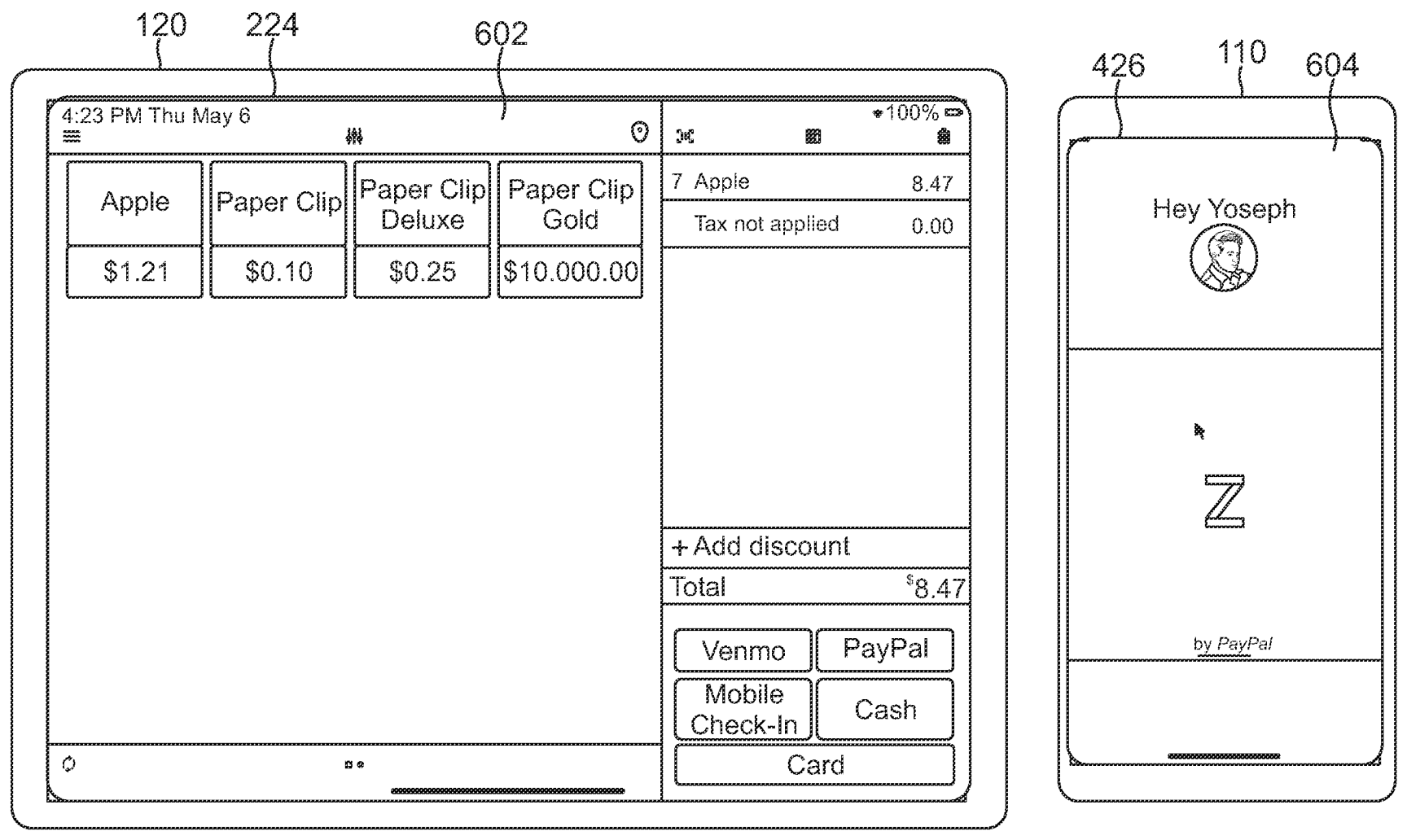

Referring now to FIGS. 6A and 6B, further details are illustrated with respect to block 502. As illustrated in FIG. 6B, the POS application 204 on the merchant device 120/200 at the merchant location 115 may display on a display provided by the display system 224 a POS application Graphical User Interface (GUI) 602. The POS application GUI 602 may provide a payment transaction screen to complete a payment request. As also illustrated in FIG. 6B, the payment application 404 on the user computing device 110/400 may display on a display provided by the display system 426 a payment application GUI 604 after the user has logged in to a user account with the payment service provider. As illustrated in FIG. 6A, once logged in to the user account and the communication channel 128a is established, the user computing device 110 may provide the location information (as indicated by the bolden arrow 600) over the communication channel 128a to the payment service provider computing device 140. As illustrated in FIG. 6A, the user computing device 110 is located in the merchant location 115. However, the user computing device 110 may be located anywhere in the physical environment 105 before being located in the merchant location 115 and provide the location information to payment service provider computing device 140.

Referring back to FIG. 5, the method 500 may then proceed to block 504 where the payment service provider computing device provides a first check-in communication that includes a first user identifier associated with the user of the user computing device to the merchant computing device. In an embodiment, at block 504, when the proximity-based check-in application 304 on the payment service provider computing device 140 determines that the user computing device 110 satisfies the proximity condition in block 502, the proximity-based check-in application 304 may provide a first check-in communication to the merchant computing device 120. In various embodiments, prior to or during method 500, the merchant computing device 120 may have launched the POS application 204 on the merchant computing device 120 causing the POS application 204 to establish the communication channel 128b with the payment service provider computing device 140.

The check-in communication provided to the merchant computing device 120 may include various information associated with the user and/or the merchant location. For example, the check-in communication may include a user identifier of the user associated with the user computing device 110 and associated with a user account managed by the payment service provider associated with the payment service provider computing device 140. The user identifier may include a photo of the user, a description of the user, a name of the user, an alphanumeric identifier assigned to the user, and/or any other user identifier that would be apparent to one of skill in the art in possession of the present disclosure. In other examples, the check-in communication may include payment options that are associated to the user's user account for completing a payment request/purchase transaction. For example, various credit card information, payment service provider information (e.g., a Venmo account, a PayPal account, etc.), and/or any payment options. In other examples, the check-in communication may include any merchant information or merchant instructions associated with the user such as a rewards program, merchant coupons specific to the user, general merchant coupons, merchant coupons associated with the merchant location 115, and/or any other merchant information and/or user information that would be apparent to one of skill in the art in possession of the present disclosure. Furthermore, by providing the check-in communication to the merchant computing device 120, the check-in communication indicates to the merchant computing device 120 that the user of the user computing device 110 is checked-in at the merchant location 115 and/or the merchant computing device 120 (e.g., the user is at the merchant location to possibly purchase goods and/or services). While the check-in communication is discussed as being provided to the merchant computing device 120, in situations where the merchant location 115 is associated with a plurality of merchant computing devices, the check-in communication may be provided to each of the merchant computing devices located at the merchant location 115.

The merchant computing device 120 may receive the check-in communication. Upon receiving the check-in communication, the merchant computing device 120 may provide a notification via the merchant I/O system 222 of the merchant computing device 120/200 that the user of the user computing device 110 is checked-in at the merchant location 115 and/or the merchant computing device 120. The notification may include the display system 224 of the merchant computing device 120/200 displaying the user identifier included in the check-in communication. For example, the display system 224 via a POS application GUI may display a picture of the user associated with the user computing device 110 and/or associated with the user account with the proximity-based check-in service. In various embodiments, other user identifiers (e.g., photos, names, etc.) of other checked-in users may be displayed via the POS application GUI provided on the display system 224 other than the user of the user computing device 110.

In some embodiments, the arrangement of the various user identifiers displayed on the POS application GUI may be displayed according to various arrangement schemes. Because the use of the proximity-based check-in system 100 is used for completing a payment request at a merchant computing device such as a POS device, the current payment request/purchase transaction is usually taking place with the user that is nearest the merchant computing device 120. Therefore, the order of the user identifiers displayed in the POS application GUI may be based on the proximity of the user computing device 110 to the merchant computing device 120. The proximity used for the arrangement of the user identifiers in the POS application GUI may be based on the most recent location information that each user computing device 110 provided to the payment service provider computing device 140. The payment service provider computing device 140 may provide that location information to the merchant computing device 120 so that the merchant computing device 120 determines the proximity of each user computing device near it. However, in other embodiments, each user computing device 110 may communicate with the merchant computing device 120 via a communication channel established between communication connection 130. For example, distance information may be determined from the relatively short-range communications providing the communication connection 130. The short-range communications may provide an identifier associated with the user computing device 110 such that the POS application 204 uses that identifier to match it with an identifier associated with a particular user identifier provided in the check-in communication. The POS application 204 may use the calculated distances of the user computing devices within the merchant location 115 and order the user identifiers displayed in the POS application GUI according to the distances. While a few examples of identifying users within a merchant location 115 and determining their proximity relative to a merchant computing device 120 are discussed, one of skill in the art in possession of the present disclosure will recognize that other systems (e.g., use of cameras with known locations to use facial recognition software and triangulation techniques to determine where a particular user is located within the merchant location 115) are contemplated and will fall under the scope of the present disclosure.

Furthermore, if there are a plurality of the merchant computing devices 120 in the merchant location 115, each merchant computing device 120 may have a different arrangement of the users because of the various locations of the merchant computing devices 120. For example, positions of users within the merchant location 115 may result in a first user being closer to a first merchant computing device than a second user and with that second user being closer to a second merchant computing device than the first user. As such, the first merchant computing device may display the first user identifier before the second user identifier and the second merchant computing device may display the second user identifier before the first user identifier. While a POS application GUI user identifier arrangement scheme is discussed based on proximity, other user identifier arrangement schemes may be contemplated by one of skill in the art in possession of the present disclosure. For example, a user identifier arrangement scheme may be based on time such that a user that first checked-in to the merchant location 115 and/or merchant computing device 120 is displayed first in the POS application GUI, a user that checked-in at a subsequent time may be displayed second in the POS application GUI, and so on. Furthermore, while some functionality is described as being completed by the merchant computing device 120, that functionality may be completed by the payment service provider computing device 140, while still falling under the scope of the present disclosure (e.g., the user identifier arrangement scheme may be performed by the payment service provider computing device 140 instead of the merchant computing devices 120.

Figure 7A:
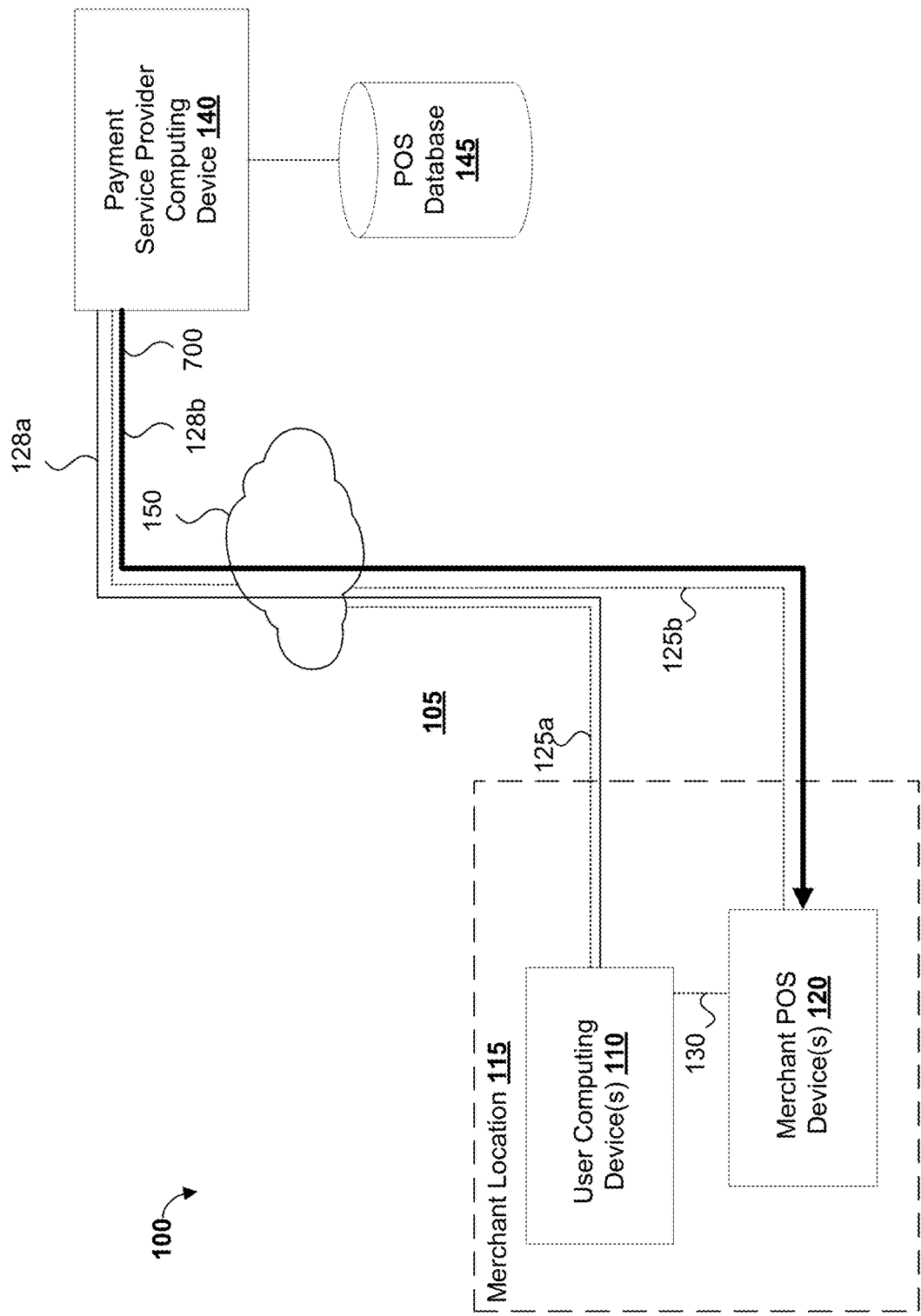
FIG. 7A is a schematic view illustrating an embodiment of the proximity-based check-in system of FIG. 1 using in performing the method of FIG. 5.
Figure 7B:
FIG. 7B are screenshots illustrating an embodiment of the GUI on the merchant computing device and the GUI on the user computing device included in the proximity-based check-in system of FIG. 1 displayed during the method of FIG. 5.
Figure 7C:
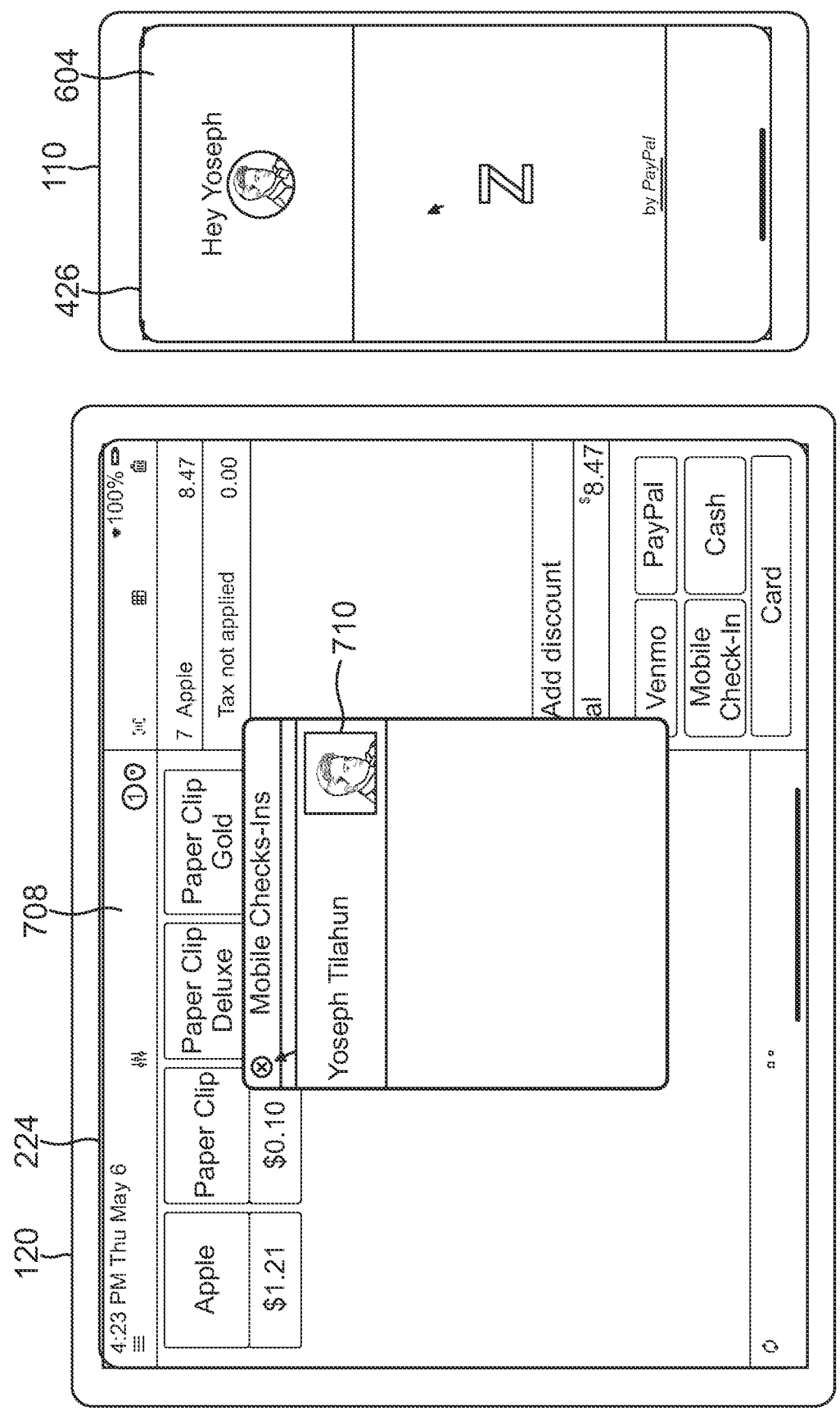
FIG. 7C are screenshots illustrating an embodiment of the GUI on the merchant computing device and the GUI on the user computing device included in the proximity-based check-in system of FIG. 1 displayed during the method of FIG. 5.

Referring now to FIGS. 7A, 7B, and 7C, a continuation of the example workflow of method 500 discussed above is illustrated with respect to block 504. As illustrated in FIG. 7A, the payment service provider computing device 140 may provide a check-in communication 700 to the merchant computing device 120 via the communication channel 128b. As illustrated in FIG. 7B, the merchant computing device 120 may use the information included in the check-in communication 700 to generate, via the display system 224, a POS application GUI 704 that may include a check-in indicator 706. As illustrated in FIG. 7C, the merchant may select the check-in indicator 706, which may cause the merchant computing device 120 to generate a POS application GUI 708 to display the user identifier 710 of the user of the user computing device 110.

Figure 8A:
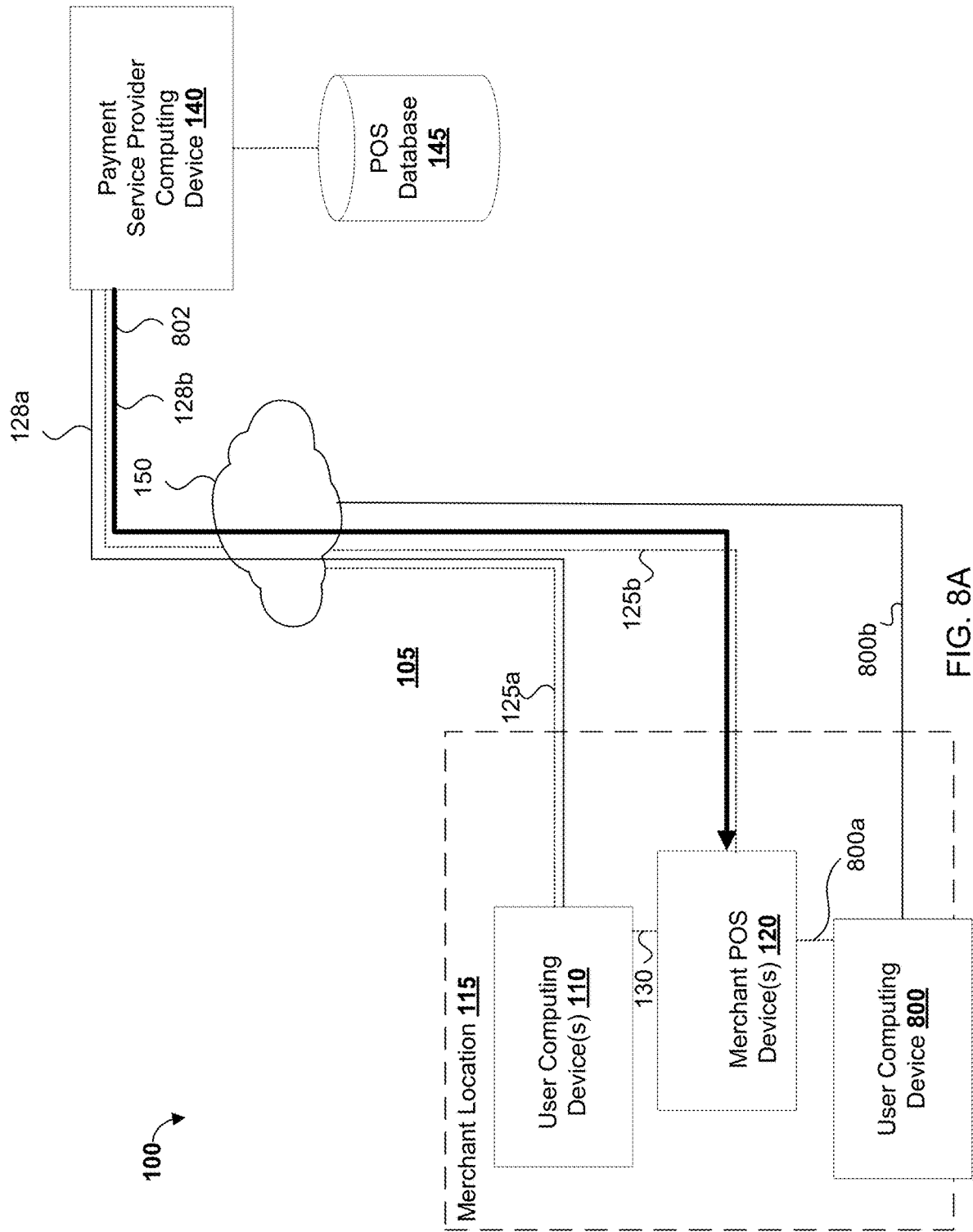
FIG. 8A is a schematic view illustrating an embodiment of the proximity-based check-in system of FIG. 1 used in performing the method of FIG. 5.
Figure 8B:
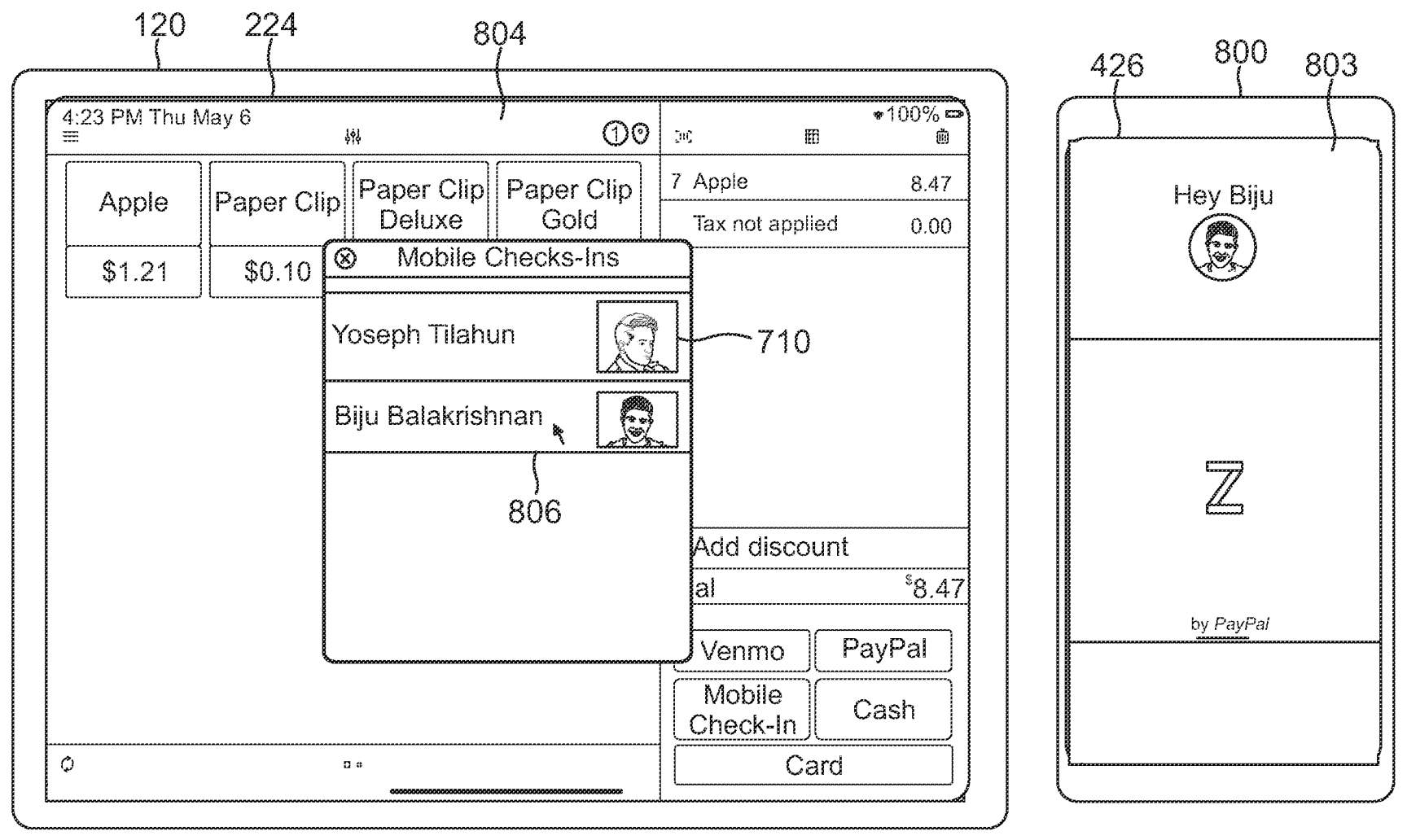

Referring now to FIGS. 8A and 8B, a user computing device 800 may be determined to be located at the merchant location 115. As such, the user computing device 800 may establish a communication connection 800a with the merchant computing device 120 and a communication channel 800b with the payment service provider computing device 140. As illustrated in FIG. 8A, the payment service provider computing device 140 may provide a check-in communication 802 to the merchant computing device 120 via the communication channel 128b indicating that the user of the user computing device 800 is checked-in to the merchant location 115. As illustrated in FIG. 8B, the payment application 404 on the user computing device 800/400 may display on a display provided by the display system 426 a payment application GUI 803 after the user has logged in to a user account. The merchant computing device 120 may use the information included in the check-in communication 802 to generate, via the display system 224, a POS application GUI 804 to display the user identifier 806 of the user of the user computing device 800 while also displaying the user identifier 710 of the user of the user computing device 110. The arrangement of the user identifiers 710 and 806 may be based on the proximity each user identifier is to the merchant computing device 120. As illustrated, the user computing device 110 is closer to the merchant computing device 120 than the user computing device 800 is from the merchant computing device 120. As such, the user identifier 710 is positioned above the user identifier 806.

Referring back to FIG. 5, the method 500 then proceeds to block 506 where a payment request that is associated with the user identifier is received. In an embodiment, at block 506, the payment service provider computing device may receive a payment request that is associated with the user identifier. Prior to receiving the payment request, the user of the user computing device 110 may approach the merchant computing device 120 to complete the purchase transaction. The merchant at the merchant computing device 120 may "ring up" the service and/or good on the merchant computing device 120 via the merchant I/O system 222 that the user of the user computing device 110 is purchasing. The merchant, via the display system 224, may proceed to check out the user of the user computing device 110 and visually identify the user on the display system 224 using that user's user identifier. The merchant, via the I/O system 222, may select the user identifier. By selecting the user identifier, the merchant computing device 120 may send the payment request and the user identifier to the payment service provider computing device 140 via the communication channel 128b. In various embodiment, selection of a particular user identifier will cause the POS application 204 to apply any coupons, rewards, and/or other user specific instructions to the payment request. Also, the selection of the particular user identifier may include a funding source from which user wishes the payment service provider computing device 140 to use to fund the payment request.

The method 500 then proceeds to block 508 where the payment request is completed using a user account associated with the user identifier included in the payment request. In an embodiment, at block 508, the payment service provider computing device 140 may determine a user account associated with the user identifier included in the payment request and process a payment associated with a payment source associated with that user account. However, in other embodiments, the payment service provider computing device 140 may first provide a confirmation payment request to the user computing device 110 that is associated with the identified user account. The confirmation payment request may cause the user computing device 110 to display a confirmation notification via the display system 426 such that the user can approve or decline the payment request. The confirmation payment request may include payment request information such as the total amount of the transaction, a merchant identifier indicating where the transaction is taking place, and/or any other information that would be apparent to one of skill in the art in possession of the present disclosure. The user may then approve or decline the payment request causing a payment request response to be provided to the payment service provider computing device 140.

The payment service provider computing device 140 may then process the payment request response. If the payment request response indicates that the user declined the payment request, then the payment service provider computing device 140 may provide a declined notification to the merchant computing device 120. If the payment request response indicates that the user approved the payment request, then the payment service provider computing device 140 may process a payment to complete the payment request and upon completion of the payment processing, send an approved notification to the merchant computing device for display on the display system 224 and/or to the user computing device 110 for display on the display system 426 indicating that the payment request was approved and completed.

Figure 9A:
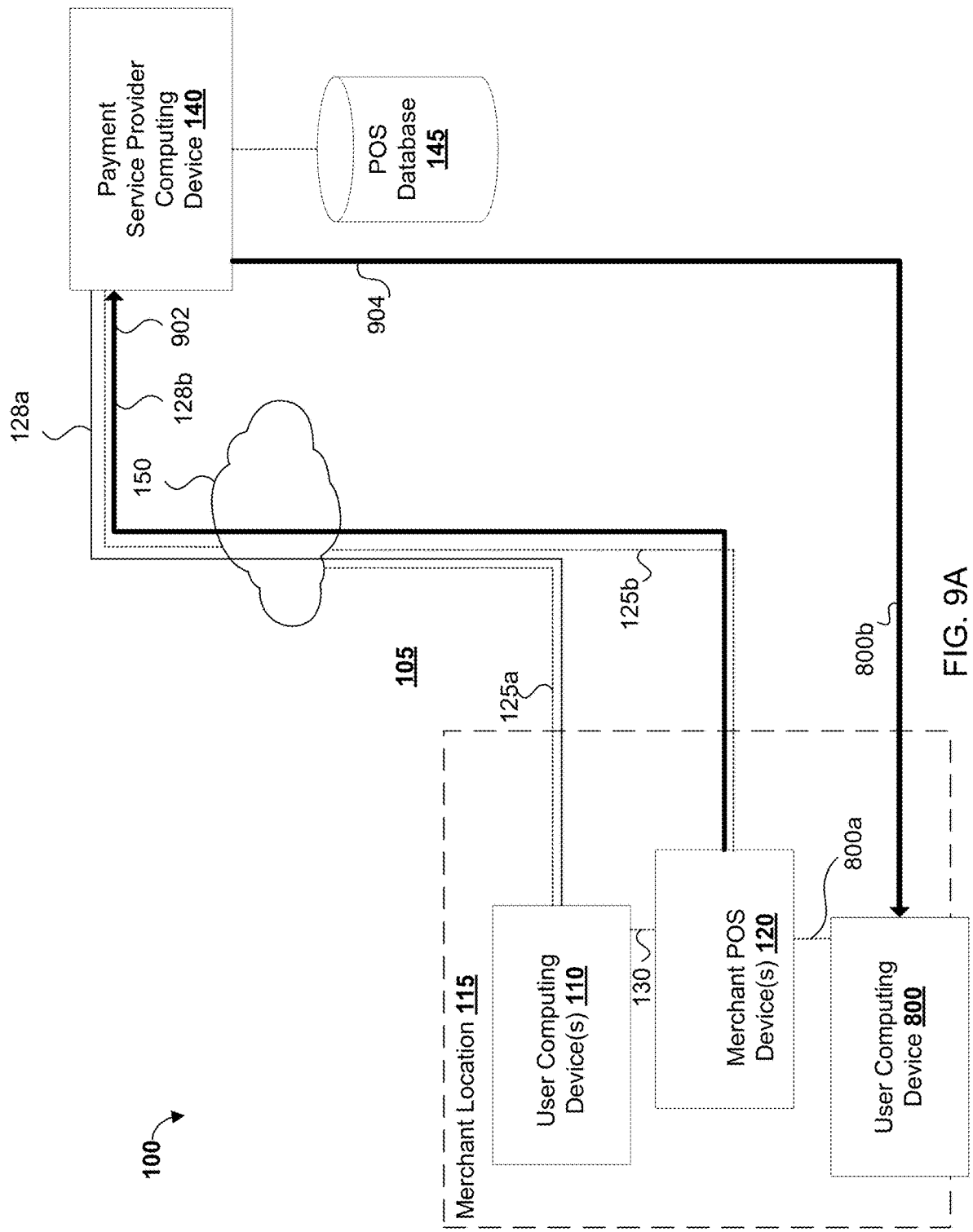
FIG. 9A is a schematic view illustrating an embodiment of the proximity-based check-in system of FIG. 1 used in performing the method of FIG. 5.
Figure 9B:
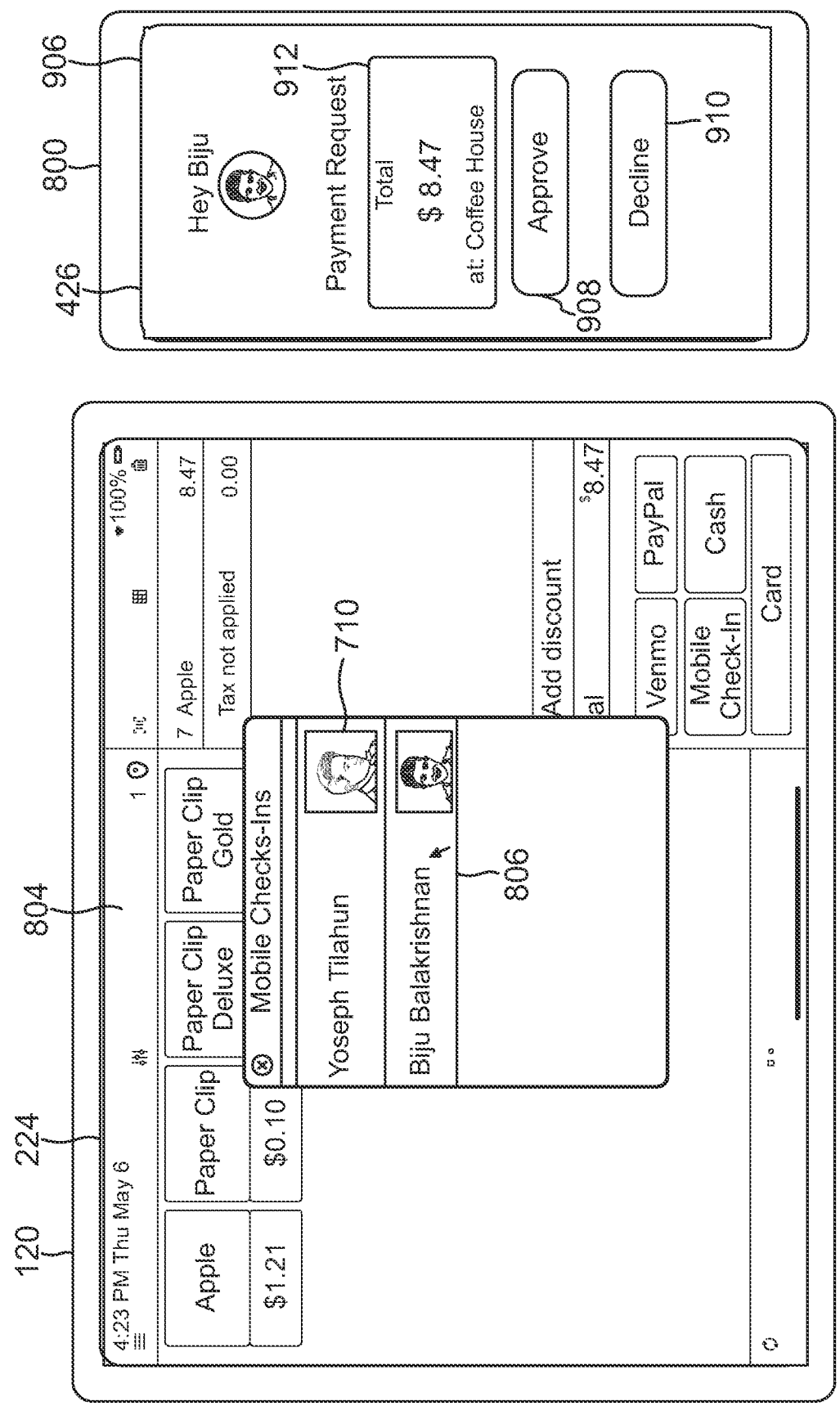
FIG. 9B are screenshots illustrating an embodiment of the GUI on the merchant computing device and the GUI on the user computing device included in the proximity-based check-in system of FIG. 1 displayed during the method of FIG. 5.

Referring now to FIGS. 9A and 9B, a continuation of the example workflow of method 500 discussed above is illustrated with respect to blocks 506 and 508. As illustrated in FIG. 9B, to complete the purchase transaction and provide the payment request, the merchant may "ring up" the goods and services and select the user identifier 806 associated with the user that is making the purchase. As illustrated in FIG. 9A, by selecting the user identifier 806, a payment request 902 may be provided via the communication channel 128b. The payment service provider computing device 140 may receive the payment request 902 and determine that the payment request is associated with the user of the user computing device 800. In some embodiments, the payment service provider computing device 140 may process the payment request 902 by funding the payment request 902. However, in other embodiments, the payment service provider computing device 140 may provide a confirmation payment request 904 to the user computing device 800. As illustrated in FIG. 9B, the user computing device 800 may generate a payment application GUI 906. The payment application GUI 906 may provide an approval indicator 908 or a decline indicator 910. The payment application GUI 906 may also display payment request information 912 about the payment request such as the total "$8.47" and the merchant associated with the merchant computing device 120 (e.g., "Coffee House").

Referring now to FIG. 10, the user of the user computing device 800 may select the approval indicator 908 or the decline indicator 910 of FIG. 9B, which causes the user computing device 800 to provide a payment request response 1002 to the payment service provider computing device 140 indicating whether the user approved or declined the confirmation payment request 904. If the user declined, the payment service provider computing device 140 may cancel the transaction and provide a declined notification to the merchant computing device 120 and/or the user computing device 110. However, if the user approved, the payment service provider computing device 140 may process the payment for the payment request 902.

Figure 11A:
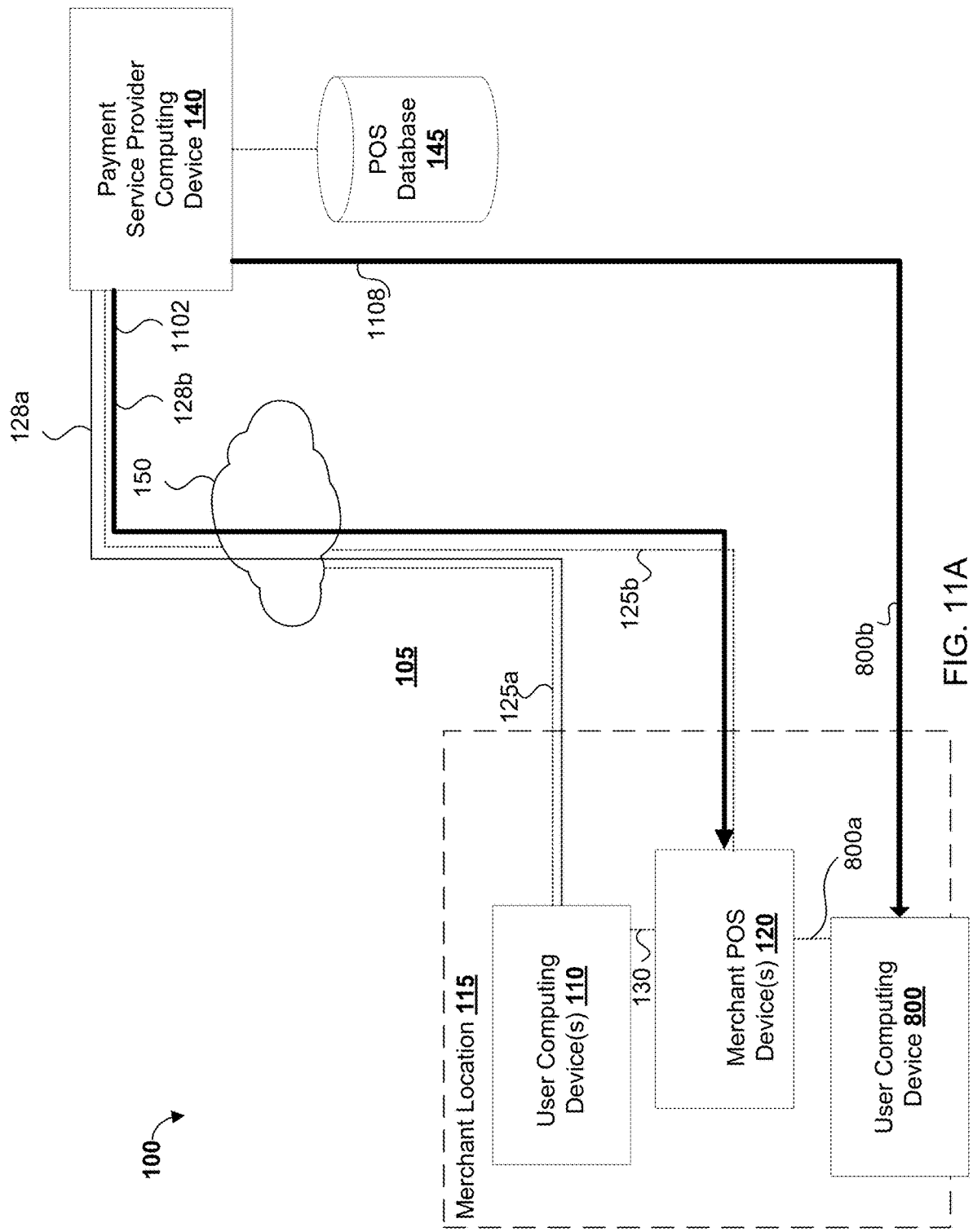
FIG. 11A is a schematic view illustrating an embodiment of the proximity-based check-in system of FIG. 1 used in performing the method of FIG. 5.
Figure 11B:
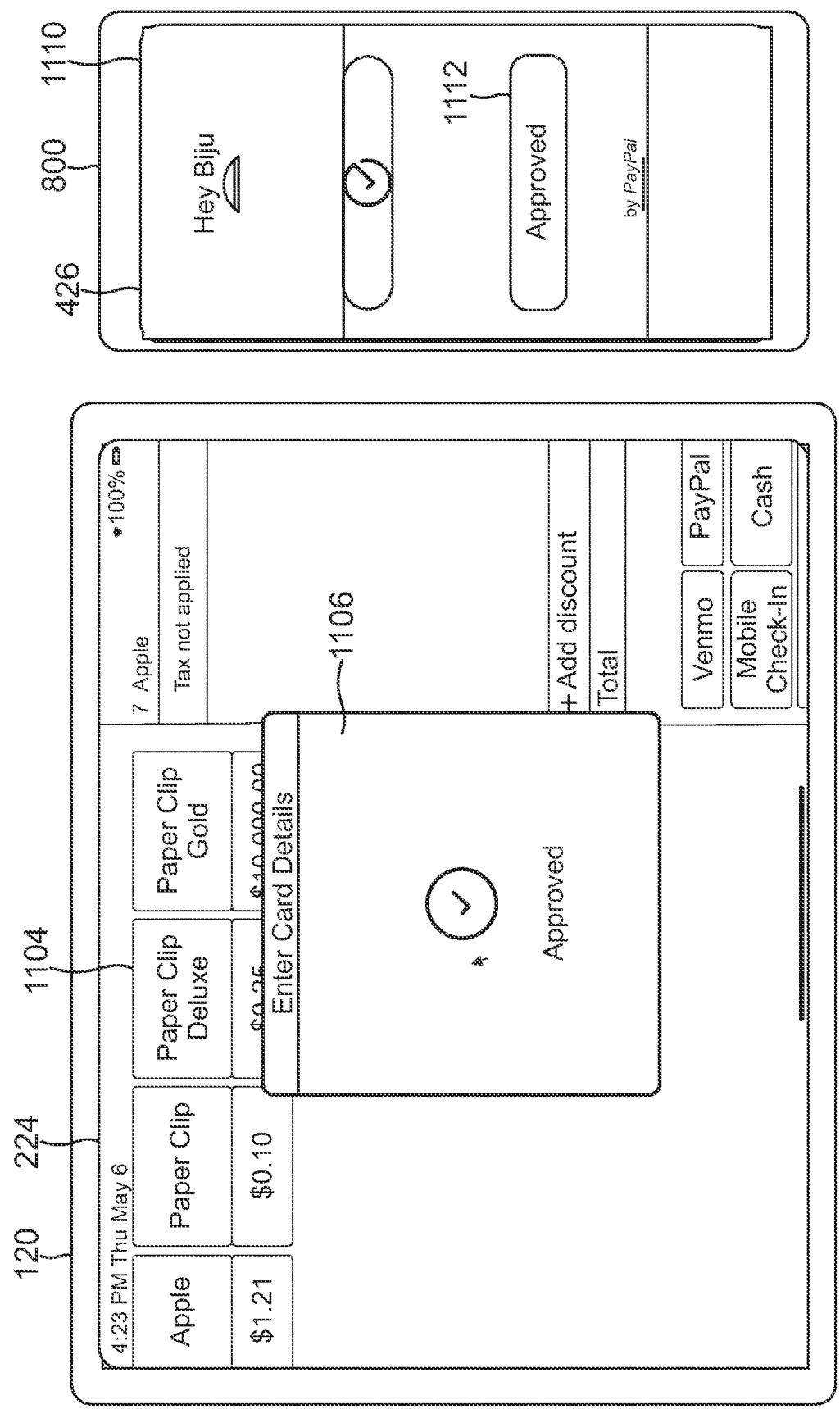
FIG. 11B are screenshots illustrating an embodiment of the GUI on the merchant computing device and the GUI on the user computing device included in the proximity-based check-in system of FIG. 1 displayed during the method of FIG. 5.

Referring now to FIGS. 11A and 11B, after processing the payment for the payment request 902, the payment service provider computing device 140 may provide a transaction complete notification 1102 to the merchant computing device 120 causing the POS application 204 to provide a POS application GUI 1104 that includes the approval notification 1106. Similarly, the payment service provider computing device 140 may provide a transaction complete notification 1108 to the user computing device 110 causing the payment application 404 to provide a payment application GUI 1110 that includes an approval notification 1112. The merchant computing device 120 may then proceed with the next transaction.

In various embodiments, of the present disclosure, the payment service provider computing device 140 may determine a user checkout condition is satisfied and cause the user identifier to no longer be displayed on the display device associated with the merchant computing device and the user to be checked-out at the merchant location. For example, the user of the user computing device 110 may leave the merchant location 115. The user computing device 110 may be detected by a beacon or other wireless communication device that is at an exit or entrance via the communication connection 130, which may provide a checkout notification to the payment service provider computing device 140. In other examples, the payment service provider computing device 140 may continue to receive location information from the user computing device 110 and use that location information to determine that the user computing device 110 does not satisfy the check in condition or otherwise satisfies a checkout condition. The payment service provider computing device 140 may provide a checkout notification that includes instructions for the merchant computing device 120 to remove a user identifier associated with the user is checked-out of the merchant location 115 from the POS application GUI.

Thus, systems and methods of the present disclosure provide for proximity-based check-in at a merchant location to complete a payment request for a purchase of goods and/or services between a user and a merchant. When a user is checked-in to a merchant location based on that user's user device being in proximity of a merchant location, a user identifier associated with the user may populate a POS application GUI of a merchant POS device. The user and merchant may conduct a transaction at the merchant POS device and select the user identifier to complete a payment request by a payment service provider. The user may receive a notification of the payment request and approve the payment request which causes the payment service provider to complete the payment request and process the payment to complete the transaction.

Figure 12:
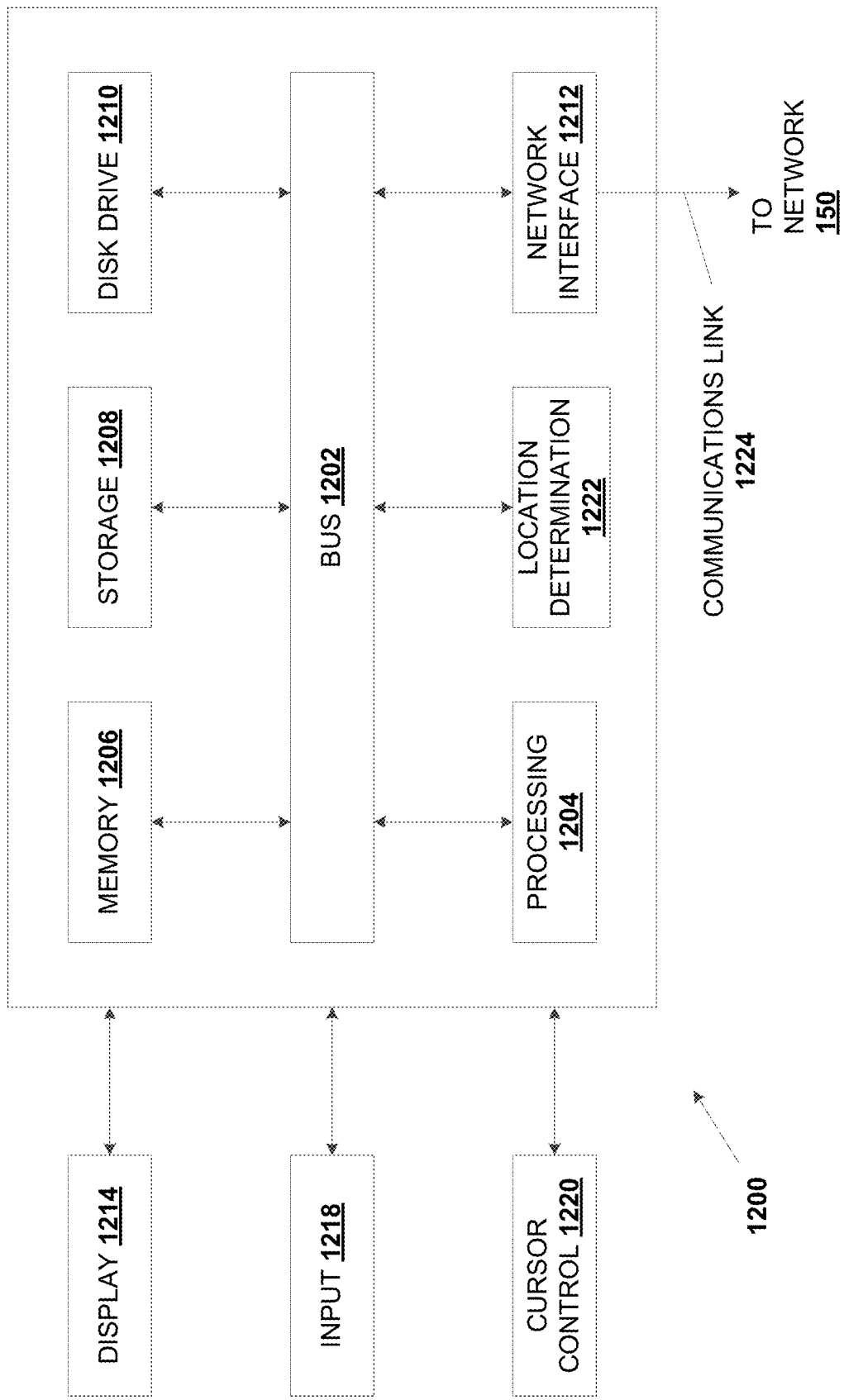
FIG. 12 is a schematic view illustrating an embodiment of a computer system.

Referring now to FIG. 12, an embodiment of a computer system 1200 suitable for implementing, for example, the user computing devices 110, 400, and 800, the merchant computing devices 120 and 200, and the payment service provider computing device 140 and 300 is illustrated. It should be appreciated that other devices utilized in the proximity-based check-in system 100 discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices.) In one implementation, the disk drive component 1210 may comprise a database having one or more disk drive components.

In accordance with embodiments of the present disclosure, the computer system 1200 performs specific operations by the processing component 1204 executing one or more sequences of instructions contained in the system memory component 1206, such as described herein with respect to the user computing devices 110, 400, and 800, the merchant computing devices 120 and 200, and the payment service provider computing device 140 and 300. Such instructions may be read into the system memory component 1206 from another computer-readable medium, such as the static storage component 1208 or the disk drive component 1210. In other embodiments, hardwired circuitry may be used in place of or in combination with software instructions to implement the present disclosure.

Logic may be encoded in a computer-readable medium, which may refer to any medium that participates in providing instructions to the processing component 1204 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 1210, volatile media includes dynamic memory, such as the system memory component 1206, and tangible media employed incident to a transmission includes coaxial cables, copper wire, and fiber optics, including wires that comprise the bus 1202 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (e.g., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
   receiving, by a payment service provider computing device from a first application executing on a first user device, a first geolocation of the first user device and a check-in request for a first user of the first user device in association with the first geolocation;
   determining, by the payment service provider computing device, that the first geolocation of the first user device is within a predetermined proximity of a second geolocation associated with a first merchant that is coupled to a network;
   providing, by the payment service provider computing device, a websocket connection directly with a first display device associated with the first merchant;
   providing, by the payment service provider computing device via the network through the websocket connection to the first merchant based on the check-in request, a first communication that includes a first user identifier associated with the first user of the first user device and a first merchant location associated with the first merchant and the second geolocation, wherein the first communication causes the first user identifier to be displayed on the first display device and the first user to be checked-in at the first merchant location associated with the first merchant and the second geolocation;
   ordering, by the payment service provider computing device on the first display device using the websocket connection, the first user identifier within a plurality of user identifiers in an ordered list displayed on the first display device, wherein the ordering is based on respective distances of a plurality of user devices including the first user device from the first display device, wherein the plurality of user devices are associated with the plurality of user identifiers, and wherein the ordered list comprises the plurality of user identifiers listed in an order based on a minimum to a maximum of the respective distances;
   communicating, by the payment service provider computing device to the first display device using the websocket connection, display data associated with available payment options for one or more of the plurality of user identifiers on the first display device based on the respective distances and the order;
   processing, by the payment service provider computing device and via the network using the websocket connection, a first payment request using a first user account that is associated with the first user identifier;
   automatically checking out, by the payment service provider computing device, the first user from the first merchant location when the first user device satisfies a checkout condition associated with the user leaving the first merchant location;
   rearranging, by the payment service provider computing device using the websocket connection, the ordered list having the first user identifier removed and one or more changes to the respective distances based on the automatically checking out; and
   bringing down, by the payment service provider computing device, the websocket connection responsive to the processing the first payment request and the automatically checking out the first user.

2. The method of claim 1, further comprising:
   providing, by the payment service provider computing device, a confirmation request to the first application on the first user device, wherein the processing the first payment request using the first user account associated with the first user identifier is in response to receiving an approval to the confirmation request.

3. The method of claim 1, further comprising:
   determining, by the payment service provider computing device, that a checkout condition is satisfied; and
   causing, by the payment service provider computing device using the websocket connection, the first user identifier to no longer be displayed on the first display device associated with the first merchant and the first user to be checked-out at the first merchant location.

4. The method of claim 1, further comprising:
   receiving, by the payment service provider computing device and via the network from a second application on a second user device, a third geolocation of the second user device;
   determining, by the payment service provider computing device, that the third geolocation is within the predetermined proximity of the second geolocation associated with the first merchant that is coupled to the network;
   providing, by the payment service provider computing device and via the network to the first merchant using the websocket connection, a second communication that includes a second user identifier associated with a second user of the second user device, wherein the second communication causes that second user identifier to be displayed on the first display device associated with the first merchant and the second user is checked-in at the first merchant location associated with the first merchant, and wherein the second user identifier is displayed on the first merchant with the first user identifier;
   receiving, via the network, a second payment request that is associated with the second user identifier; and
   completing the second payment request using a second user account associated with the second user identifier.

5. The method of claim 1, further comprising:
   determining, by the payment service provider computing device, that the first geolocation is within the predetermined proximity of a third geolocation associated with a second merchant that is coupled to the network; and
   providing, by the payment service provider computing device via the network to the second merchant, a second communication that includes the first user identifier associated with the first user of the first user device and the first merchant location, wherein the second communication causes the first user identifier to be displayed on a second display device associated with the second merchant and the first user is checked-in at the first merchant location, wherein the first merchant and the second merchant display the first user identifier concurrently.

6. The method of claim 1, wherein the first communication includes discount instructions that are used when calculating a payment request amount for the first payment request.

7. A non-transitory machine-readable medium having stored thereon machine readable instructions executable to cause a machine to perform operations comprising:
receiving, by a payment service provider computing device from a first application executing on a first user device, a first geolocation of the first user device and a check-in request for a first user of the first user device in association with the first geolocation;
determining that the first geolocation of the first user device is within a predetermined proximity of a second geolocation associated with a first merchant that is coupled to a network;
determining a communication channel enabling communications directly with a first display device associated with the first merchant;
providing, via the network through the communication channel to the first merchant based on the check-in request, a first communication that includes a first user identifier associated with the first user of the first user device and a first merchant location associated with the first merchant and the second geolocation, wherein the first communication causes the first user identifier to be displayed on the first display device and the first user to be checked-in at the first merchant location associated with the first merchant and the second geolocation;
ordering, by the payment service provider computing device on the first display device using the communication channel, the first user identifier within a plurality of user identifiers in an ordered list displayed on the first display device, wherein the ordering is based on respective distances of a plurality of user devices including the first user device from the first display device, wherein the plurality of user devices are associated with the plurality of user identifiers, and wherein the ordered list comprises the plurality of user identifiers listed in an order based on a minimum to a maximum of the respective distances;
displaying, on the first display device using the communication channel, display data associated with available payment options for one or more of the plurality of user identifiers on the first display device based on the respective distances and the order;
processing, via the network using the communication channel, a first payment request using a first user account that is associated with the first user identifier;
automatically checking out, by the payment service provider computing device, the first user from the first merchant location when the first user device satisfies a checkout condition associated with the user leaving the first merchant location;
updating, using the communication channel, the list on the first display device by removing the first user identifier and rearranging the plurality of user identifiers based on one or more changes to the respective distances based on the automatically checking out; and
ending the communication channel responsive to the processing the first payment request.

8. The non-transitory machine-readable medium of claim 7, wherein the operations further comprise:
providing a confirmation request to the first application on the first user device, wherein the processing the first payment request using the first user account associated with the first user identifier is in response to receiving an approval to the confirmation request.

9. The non-transitory machine-readable medium of claim 7, wherein the operations further comprise:
determining that a checkout condition is satisfied; and
causing, using the communication channel, the first user identifier to no longer be displayed on the first display device associated with the merchant and the first user to be checked-out at the merchant location.

10. The non-transitory machine-readable medium of claim 7, wherein the operations further comprise:
receiving, via the network from a second application on a second user device, a third geolocation of the second user device;
determining that the third geolocation is within the predetermined proximity to the second geolocation associated with the merchant that is coupled to the network;
providing, via the network to the merchant using the communication channel, a second communication that includes a second user identifier associated with a second user of the second user device, wherein the second communication causes the second user identifier to be displayed on the first display device associated with the merchant and the second user is checked-in at the merchant location associated with the merchant, and wherein the second user identifier is displayed on the merchant with the first user identifier;
receiving, via the network, a second payment request that is associated with the second user identifier; and
completing the second payment request using a second user account associated with the second user identifier.

11. The non-transitory machine-readable medium of claim 10, wherein the displaying, on the first display device, the display data is responsive to determining that the third geolocation is within the predetermined proximity.

12. A system, comprising:
a non-transitory memory storing instructions; and
one or more hardware processors coupled to the non-transitory memory and configured to read the instructions from the non-transitory memory to cause the system to perform operations comprising:
receiving, from a first application executing on a first user device, a first geolocation of the first user device and a check-in request for a first user of the first user device in association with the first geolocation;
determining that the first geolocation of the first user device is within a predetermined proximity of a second geolocation associated with a first merchant that is coupled to a network;
determining a communication channel over a network connection directly with a first display device associated with the first merchant;
providing, via the network through the communication channel to the first merchant based on the check-in request, a first communication that includes a first user identifier associated with the first user of the first user device and a first merchant location associated with the first merchant and the second geolocation, wherein the first communication causes the first user identifier to be displayed on the first display device and the first user to be checked-in at the first merchant location associated with the first merchant and the second geolocation;
ordering, on the first display device using the communication channel, the first user identifier within a plurality of user identifiers in an ordered list displayed on the first display device, wherein the ordering is based on respective distances of a plurality of user devices including the first user device from the first display device, wherein the plurality of user devices are associated with the plurality of user identifiers, and wherein the ordered list comprises the plurality of user identifiers listed in an order based on a minimum to a maximum of the respective distances;

displaying, on the first display device using the communication channel, display data associated with available payment options for one or more of the plurality of user identifiers on the first display device based on the respective distances and the order;

processing, via the network using the communication channel, a first payment request using a first user account that is associated with the first user identifier;

automatically checking out the first user from the first merchant location when the first user device satisfies a checkout condition associated with the user leaving the first merchant location;

updating, using the communication channel, the list on the first display device by removing the first user identifier and rearranging the plurality of user identifiers based on one or more changes to the respective distances based on the automatically checking out; and terminating the communication channel responsive to the automatically checking out the first user.

13. The system of claim 12, wherein the operations further comprise:

providing a confirmation request to the first application on the first user device, wherein the processing the first payment request using the first user account associated with the first user identifier is in response to receiving an approval to the confirmation request.

14. The system of claim 12, wherein the operations further comprise:

determining that a checkout condition is satisfied; and causing, using the communication channel, the first user identifier to no longer be displayed on the first display device associated with the merchant and the first user to be checked-out at the merchant location.

15. The system of claim 12, wherein the operations further comprise:

receiving, via the network from a second application on a second user device, a third geolocation of the second user device;

determining that the third geolocation is within the predetermined proximity to the second geolocation associated with the merchant that is coupled to the network;

providing, via the network to the merchant using the communication channel, a second communication that includes a second user identifier associated with a second user of the second user device, wherein the second communication causes the second user identifier to be displayed on the first display device associated with the merchant and the second user is checked-in at the merchant location associated with the merchant, and wherein the second user identifier is displayed on the merchant with the first user identifier;

receiving, via the network, a second payment request that is associated with the second user identifier; and completing the second payment request using a second user account associated with the second user identifier.

16. The system of claim 15, wherein the displaying, on the first display device, the display data is responsive to determining that the third geolocation is within the predetermined proximity.

17. The system of claim 12, wherein the operations further comprise:

determining that the first geolocation is within the predetermined proximity of a third geolocation associated with a second merchant that is coupled to the network; and providing, via the network to the second merchant, a second communication that includes the first user identifier associated with the first user of the first user device and the first merchant location, wherein the second communication causes the first user identifier to be displayed on a second display device associated with the second merchant and the first user is checked-in at the first merchant location, wherein the first merchant and the second merchant display the first user identifier concurrently.

18. The system of claim 12, wherein the first communication includes discount instructions that are used when calculating a payment request amount for the first payment request.

19. The system of claim 12, wherein the operations further comprise:

determining the respective distances based on one or more short range wireless connections between one or more of the plurality of user devices.

20. The system of claim 12, wherein the operations further comprise:

determining the first geolocation of the first user device via a first web socket enabling communications between the first user device and the merchant, wherein the providing the first communication is via a second web socket.

* * * * *